US010078986B2

(12) United States Patent
Hadwen

(10) Patent No.: US 10,078,986 B2
(45) Date of Patent: Sep. 18, 2018

(54) ACTIVE MATRIX DEVICE AND METHOD OF DRIVING

(71) Applicant: Sharp Life Science (EU) Limited, Oxford (GB)

(72) Inventor: Benjamin James Hadwen, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 255 days.

(21) Appl. No.: 14/854,607

(22) Filed: Sep. 15, 2015

(65) Prior Publication Data

US 2017/0076676 A1    Mar. 16, 2017

(51) Int. Cl.
*G09G 3/34* (2006.01)
*G02B 26/00* (2006.01)

(52) U.S. Cl.
CPC ........... *G09G 3/348* (2013.01); *G02B 26/005* (2013.01); *G09G 2300/0421* (2013.01); *G09G 2310/0208* (2013.01); *G09G 2310/0294* (2013.01); *G09G 2310/062* (2013.01); *G09G 2320/0295* (2013.01)

(58) Field of Classification Search
CPC ................. G09G 3/348; B01L 3/50273; B01L 2400/0427; G02B 26/005
See application file for complete search history.

(56) References Cited

U.S. PATENT DOCUMENTS

| 6,565,727 | B1 | 5/2003 | Shenderov |
| 6,911,132 | B2 | 6/2005 | Pamula et al. |
| 7,163,612 | B2 | 1/2007 | Sterling et al. |
| 8,173,000 | B1 | 5/2012 | Hadwen et al. |
| 8,653,832 | B2 | 2/2014 | Hadwen et al. |
| 2007/0086078 | A1* | 4/2007 | Hagood ............... G09G 3/3433 359/298 |

(Continued)

FOREIGN PATENT DOCUMENTS

EP    2404675    1/2012

OTHER PUBLICATIONS

"Digital microfluidics: is a true lab-on-a-chip possible?", R.B. Fair, Microfluid Nanofluid (2007) 3:245-281).

*Primary Examiner* — Kevin M Nguyen
(74) *Attorney, Agent, or Firm* — Renner, Otto, Boisselle & Sklar, LLP

(57) ABSTRACT

An active matrix electro-wetting on dielectric (AM-EWOD) device includes a plurality of array elements arranged in an array, each of the array elements including array element circuitry, an element electrode, and a reference electrode. The array element circuitry includes an actuation circuit configured to apply actuation voltages to the electrodes, and an impedance sensor circuit configured to sense impedance at the array element electrode to determine a droplet property at the array element. The impedance sensor circuit is operated by perturbing a potential applied to the reference electrode. The AM-EWOD device includes a common row addressing line. The impedance sensor circuit further is operated by supplying voltage signals over the common addressing line to effect both a reset operation and an operation for selecting a row in the array to be sensed. The circuitry isolates the array element from the actuation voltage during operating the impedance sensor circuit.

20 Claims, 17 Drawing Sheets

DROPLET PRESENT

(56) References Cited

U.S. PATENT DOCUMENTS

2010/0177026 A1\* 7/2010 Van Dijk ................ G02B 3/14
345/84
2010/0194408 A1\* 8/2010 Sturmer ................ G01N 27/22
324/664

\* cited by examiner

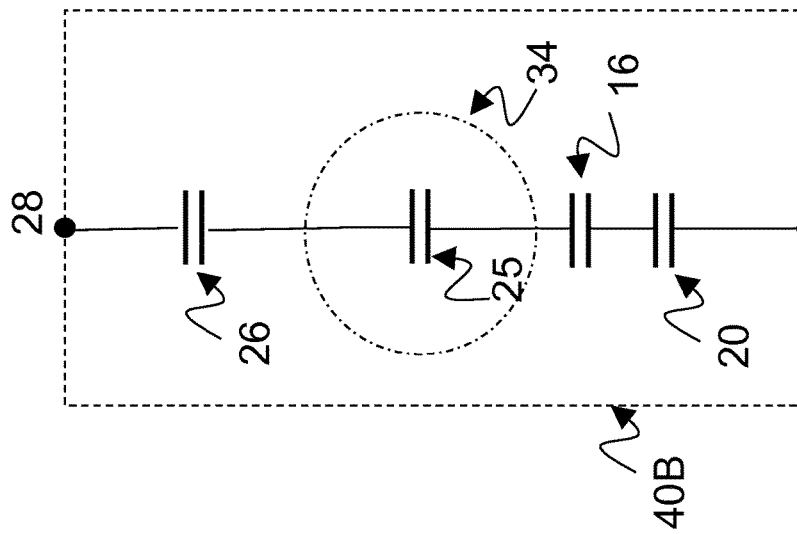
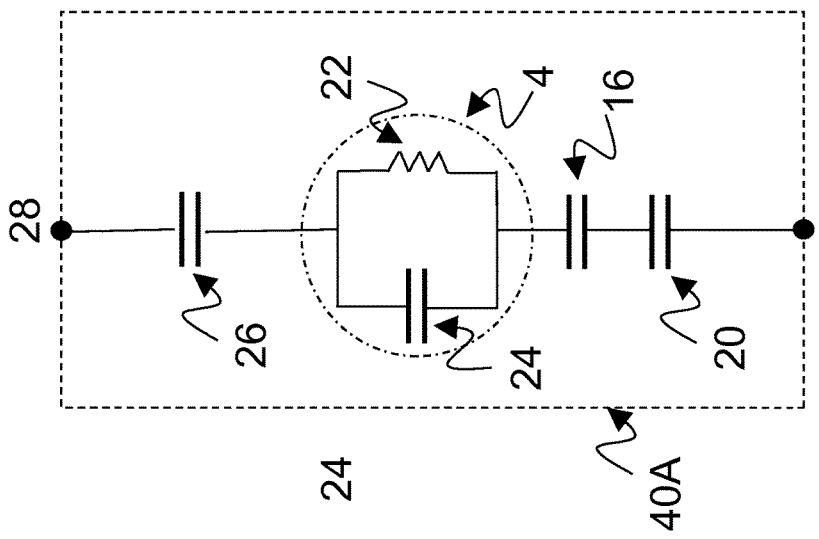

ACTIVE MATRIX DEVICE AND METHOD OF DRIVING

TECHNICAL FIELD

The present invention relates to active matrix arrays and elements thereof. In a particular aspect, the present invention relates to digital microfluidics, and more specifically to Active Matrix Electro-wetting-On-Dielectric (AM-EWOD), and further relates to methods of driving such a device.

BACKGROUND ART

Electro-wetting on dielectric (EWOD) is a well known technique for manipulating droplets of fluid by application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 shows a part of a conventional EWOD device in cross section. The device includes a lower substrate 72, the uppermost layer of which is formed from a conductive material which is patterned so that a plurality of array element electrodes 38 (e.g., 38A and 38B in FIG. 1) are realized. The electrode of a given array element may be termed the array element electrode 38. The liquid droplet 4, comprising a polar material (which is commonly also aqueous and/or ionic), is constrained in a plane between the lower substrate 72 and a top substrate 36. A suitable gap between the two substrates may be realized by means of a spacer 32, and a non-polar fluid 34 (e.g. oil) may be used to occupy the volume not occupied by the liquid droplet 4. An insulator layer 20 disposed upon the lower substrate 72 separates the conductive element electrodes 38A, 38B from a first hydrophobic coating 16 upon which the liquid droplet 4 sits with a contact angle 6 represented by θ. The hydrophobic coating is formed from a hydrophobic material (commonly, but not necessarily, a fluoropolymer).

On the top substrate 36 is a second hydrophobic coating 26 with which the liquid droplet 4 may come into contact. Interposed between the top substrate 36 and the second hydrophobic coating 26 is a reference electrode 28.

The contact angle θ6 is defined as shown in FIG. 1, and is determined by the balancing of the surface tension components between the solid-liquid ($\gamma_{SL}$), liquid-gas ($\gamma_{LG}$) and non-polar fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \quad \text{(equation 1)}$$

In certain cases, the relative surface tensions of the materials involved (i.e the values of $\gamma_{SL}$, $\gamma_{LG}$ and $\gamma_{SG}$) may be such that the right hand side of equation (1) is less than −1. This may commonly occur in the case in which the non-polar fluid 34 is oil. Under these conditions, the liquid droplet 4 may lose contact with the hydrophobic coatings 16 and 26, and a thin layer of the non-polar fluid 34 (oil) may be formed between the liquid droplet 4 and the hydrophobic coatings 16 and 26.

In operation, voltages termed the EW drive voltages, (e.g. $V_T$, $V_0$ and $V_{00}$ in FIG. 1) may be externally applied to different electrodes (e.g. reference electrode 28, array element electrodes 38, 38A and 38B, respectively). The resulting electrical forces that are set up effectively control the hydrophobicity of the hydrophobic coating 16. By arranging for different EW drive voltages (e.g. $V_0$ and $V_{00}$) to be applied to different element electrodes (e.g. 38A and 38B), the liquid droplet 4 may be moved in the lateral plane between the two substrates 72 and 36.

In the following description, it will be assumed that an element of an EWOD device, such as the device of FIG. 1, may receive "digital" data so that the element is required to be put in either an "actuated" state, in which the voltage applied across the element is sufficient for a liquid droplet in the element (if one is present in the element) to experience a significant electro-wetting force, or a "non-actuated" state, in which the voltage applied across the element is not sufficient for a liquid droplet in the element (if one is present in the element) to experience a significant electro-wetting force. An element of an EWOD device may be put into the actuated state by applying a voltage difference across the EWOD element having a magnitude that is equal to, or greater than, a threshold voltage $V_{EW}$, whereas if the voltage difference across the EWOD element has a magnitude that is less than the threshold voltage $V_{EW}$ the element is in its non-actuated state. The threshold voltage $V_{EW}$ is often referred to as an "actuation voltage", and this term is used below. In practice, the threshold voltage may typically be determined as the minimum voltage required to effect droplet operations, for example the moving or splitting of droplets. In practice, the non-actuated state may typically be zero volts. Typically EWOD systems may be considered to be digital, in that the EWOD elements are programmed either to an actuated or non-actuated state. It should however be understood that an EWOD device may also be operated by supplying analogue data, such that EWOD elements may be partially actuated.

U.S. Pat. No. 6,565,727 (Shenderov, issued May 20, 2003) discloses a passive matrix EWOD device for moving droplets through an array.

U.S. Pat. No. 6,911,132 (Pamula et al., issued Jun. 28, 2005) discloses a two dimensional EWOD array to control the position and movement of droplets in two dimensions.

U.S. Pat. No. 6,565,727 further discloses methods for other droplet operations including the splitting and merging of droplets, and the mixing together of droplets of different materials.

U.S. Pat. No. 7,163,612 (Sterling et al., issued Jan. 16, 2007) describes how TFT based thin film electronics may be used to control the addressing of voltage pulses to an EWOD array by using circuit arrangements similar to those employed in Active Matrix (AM) display technologies.

The approach of U.S. Pat. No. 7,163,612 may be termed "Active Matrix Electro-wetting on Dielectric" (AM-EWOD). There are several advantages in using TFT based thin film electronics to control an EWOD array, namely:

Electronic driver circuits can be integrated onto the lower substrate 72.
TFT-based thin film electronics are well suited to the AM-EWOD application. They are cheap to produce so that relatively large substrate areas can be produced at relatively low cost.
TFTs fabricated in standard processes can be designed to operate at much higher voltages than transistors fabricated in standard CMOS processes. This is significant since many EWOD technologies require EWOD actuation voltages in excess of 20V to be applied.

A disadvantage of U.S. Pat. No. 7,163,612 is that it does not disclose any circuit embodiments for realizing the TFT backplane of the AM-EWOD.

EP2404675 (Hadwen et al., published Jan. 11, 2012) describes array element circuits for an AM-EWOD device. Various methods are known for programming and applying an EWOD actuation voltage to the EWOD element electrode. The programming function described includes a memory element of standard means, for example, based on Dynamic RAM (DRAM) or Static RAM (SRAM) and input lines for programming the array element.

Whilst EWOD (and AM-EWOD) devices can be operated with either DC or AC actuation voltages, in practice there are many reasons for preferring an AC method of driving, as reviewed in the previously cited reference R. B. Fair, Microfluid Nanofluid (2007) 3:245-281). It may be noted that droplets can be actuated and manipulated for a wide range of AC driving frequencies ranging typically from a few hertz to several kHz.

U.S. Pat. No. 8,173,000 (Hadwen et al., issued May 8, 2012) describes an AM-EWOD device with an array element circuit and an AC method of driving.

U.S. Pat. No. 8,653,832 (Hadwen et al., issued Feb. 18, 2014) describes how an impedance (capacitance) sensing function can be incorporated into the array element. The impedance sensor may be used for determining the presence and size of liquid droplets present at each electrode in the array.

UK Application GB1500260.3, which is herein incorporated by reference, describes a one transistor (1T) array element circuit and a method of driving for implementing an AC driving method of driving.

UK Application GB1500261.1, which is herein incorporated by reference, describes a two transistor (2T) array element circuit and a method of driving for implementing an AC driving method of driving. The 2T array element actuation circuit disclosed also is shown in FIG. 2 of the current application. The UK application further includes an embodiment showing how the impedance (capacitance) sensing function of U.S. Pat. No. 8,653,832 can be combined with the 2T array element actuation circuit. The array element circuit, including the sensor function, is shown in FIG. 3 and contains a total of 5 transistors, 3 capacitors and 9 addressing lines. Addressing lines DATA and ENABLE control access to a Dynamic RAM memory circuit comprising the transistor to which they are connected and a capacitor. The voltage programmed to this capacitor in turn controls whether or not the input signal ACTUATE is connected through to an array element electrode. The input signal SEN may further be used to isolate the element electrode from the ACTUATE signal when the sensor is being operated. The sensor function is controlled by two voltage signals applied to terminals RWS and RST. The voltage signal applied to RST resets the voltage at the gate of a sense transistor (connected between VDD and COL) to a reset potential VRST. The voltage signal applied to RWS perturbs the voltage at the element electrode by an amount dependent on the ratio of the fixed capacitors in the circuit present at the element electrode and the capacitance presented by the presence or absence by a liquid droplet at the element electrode. A voltage signal is thus coupled to the gate of the sensing transistor which is converted to an output current through COL. The impedance presented at the element electrode may thus be measured.

SUMMARY OF INVENTION

A first aspect of the invention provides an array element circuit and method of driving an element of an active matrix electro-wetting on dielectric (AM-EWOD) device, the AM-EWOD element having an element electrode and a reference electrode.

The method comprises actuation of a liquid droplet which may be present at the location of the array element, and also the sensing of the impedance associated with a droplet, or the absence of a droplet at the location of the array element.

The method of droplet actuation is comprised of applying a first alternating voltage to the reference electrode; and either applying to the element electrode a second alternating voltage that has the same frequency as the first alternating voltage and that is out of phase with the first alternating voltage, or holding the element electrode in a high impedance state.

The method of sensing the impedance may comprise applying a voltage signal via the reference electrode so as to perturb the potential of the element electrode, the perturbation being a function of the impedance presented at the element electrode. The method of sensing the impedance may comprise comparing the impedance presented at the element electrode with a reference impedance in the array element circuit.

A storage capacitor (which may be used for storing the programmed actuation state) may further participate in the sensing function of the array element circuit.

According to a first aspect of the invention, the row select and reset operations associated with the operation of the sensor may be performed by a common addressing line. This may be implemented by connecting this common addressing line to the gate of a transistor connected between a reset voltage supply and the gate of a sensing transistor.

According to a second aspect of the invention, the addressing line used to perform sensor row select may also be used to disconnect an actuation signal from the element electrode during the sensor operation.

According to a third aspect of the invention, the sensor function may be implemented by means of perturbing the voltage on a single row addressing line.

The sensor function may be configured so as to measure the presence versus absence or size of liquid droplet(s) at one or more elements in the array. The sensor function may further be configured to measure the complex impedance associated with liquid droplet(s) at one or more elements in the array. The sensor function may still further be configured so as to determine the electrical conductivity of the liquid droplets at one or more elements in the array.

The AM-EWOD device may comprise a plurality of AM-EWOD elements arranged in a matrix or array of rows and columns, and wherein the method may comprise arranging for an instantaneous value of the second alternating voltage applied to a row of AM-EWOD elements to be equal to an instantaneous value of the first alternating voltage at a time of putting the element electrodes of AM-EWOD elements of the row into the high impedance state.

An advantage of the invention is that an array element circuit having both an actuate and sensor function, may be implemented with a minimal number of circuit components and addressing lines, and fewer than the circuit arrangements described in the prior art. Reducing the complexity and the number of transistors in the array element circuit is advantageous for several reasons:

- Smaller array elements/element electrodes 38 may be realized. As a result, smaller liquid droplets 4 may be manipulated. This is particularly important for applications involving the manipulation or analysis of single cells or single molecules. Also, if using larger liquid droplets 4, sub-droplet resolution of actuation may be achieved. This may improve the capabilities of the device, for example enabling more accurate splitting or faster mixing. Also, smaller array element sizes facilitate the design and fabrication of very large format arrays which may have a total number of array elements in excess of 1 million, and which may be able to manipulate tens to hundreds of thousands of liquid droplets 4, simultaneously and independently.
- A smaller and simpler design of the array element circuit may facilitate increased manufacturing yield and hence lower cost of the device.
- A smaller and simpler design of the array element circuit may facilitate increased optical transparency of the device.
- A smaller and simpler design of the array element circuit may free up space within the array element to implement other electronic functions into the array element, e.g. temperature sensing, bio-sensing and like operations.

A further advantage of the invention is that it realizes a sensor having improved linearity compared to the prior art circuits.

A still further advantage of the invention is that arrangements are possible whereby the electrical properties of the liquid droplet, e.g. its electrical conductivity, may be measured.

BRIEF DESCRIPTION OF DRAWINGS

In the annexed drawings, like references indicate like parts or features:

FIG. 6A shows a circuit representation of the electrical load presented at the element electrode when a liquid droplet is present;

FIG. 6B shows a circuit representation of the electrical load presented at the element electrode when no liquid droplet is present;

Figure 1:
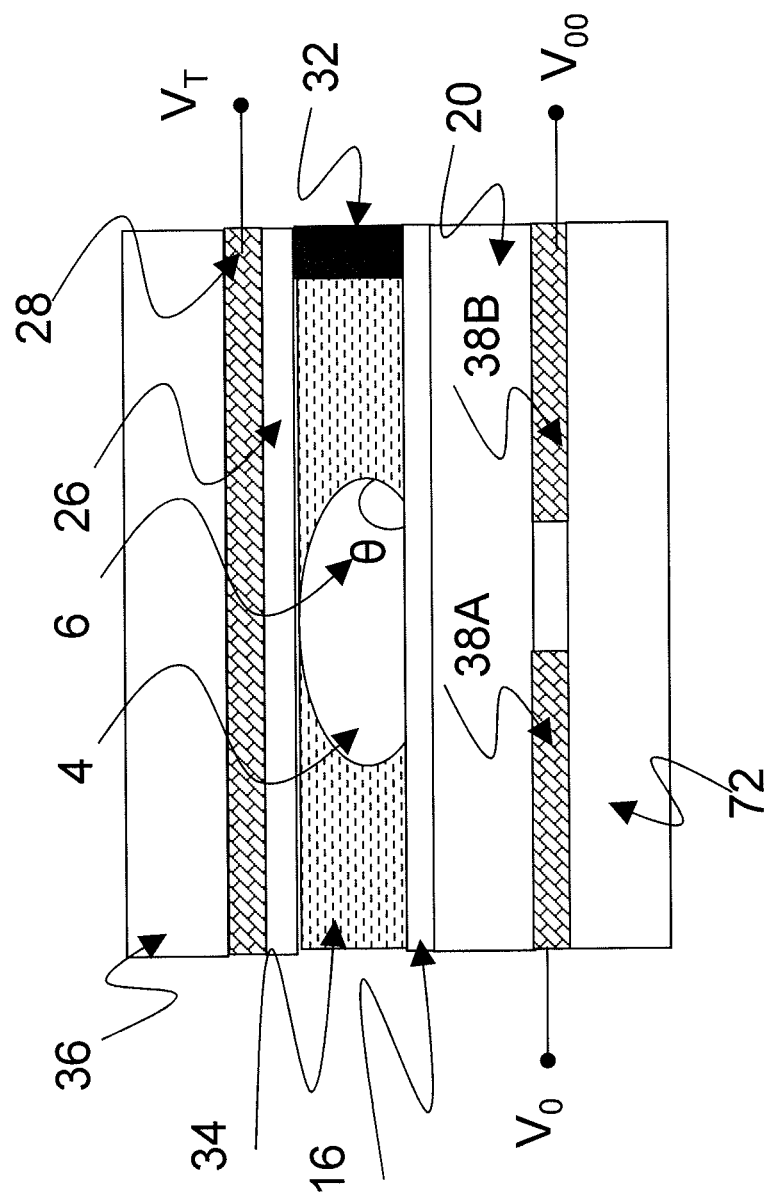
FIG. 1 shows prior art, particularly a schematic diagram depicting a conventional EWOD device in cross-section.
Figure 2:
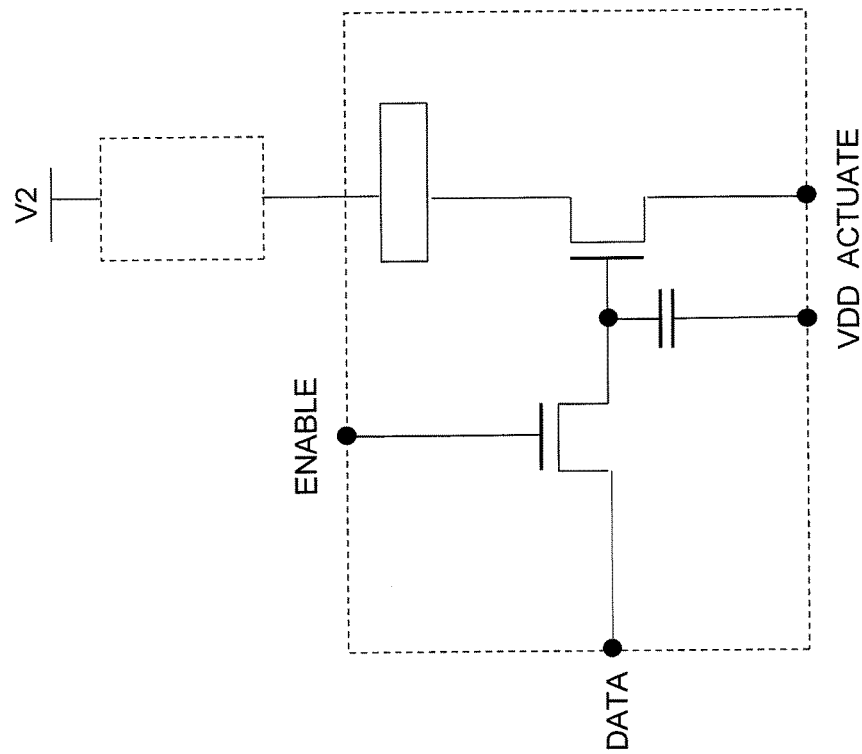
FIG. 2 shows prior art, particularly a 2-transistor AM-EWOD array element actuation circuit.

DESCRIPTION OF REFERENCE NUMERALS 4 liquid droplet
6 contact angle θ
16 First hydrophobic coating
20 Insulator layer
22 Resistor
24 Capacitor
25 Capacitor
26 Second hydrophobic coating
28 Reference electrode
32 Spacer
34 Non-polar fluid
36 Top substrate
38/38A and 38B Array Element Electrodes
40/40A/40B Electrical load
42 Electrode array
46 Actuation circuit
48 Sensor circuit
52 Transistor
54 Transistor
55 Transistor
56 Capacitor
58 Transistor
60 Capacitor
62 Sensing Transistor
72 Lower Substrate
74 Thin film electronics
76 Row driver circuit
78 Column driver circuit
80 Serial interface
82 Connecting wires
83 Voltage supply interface
84 Array element circuit
86 Column detection circuit
88 Sensor row addressing
90 Actuation circuit

DETAILED DESCRIPTION OF INVENTION

Figure 4:
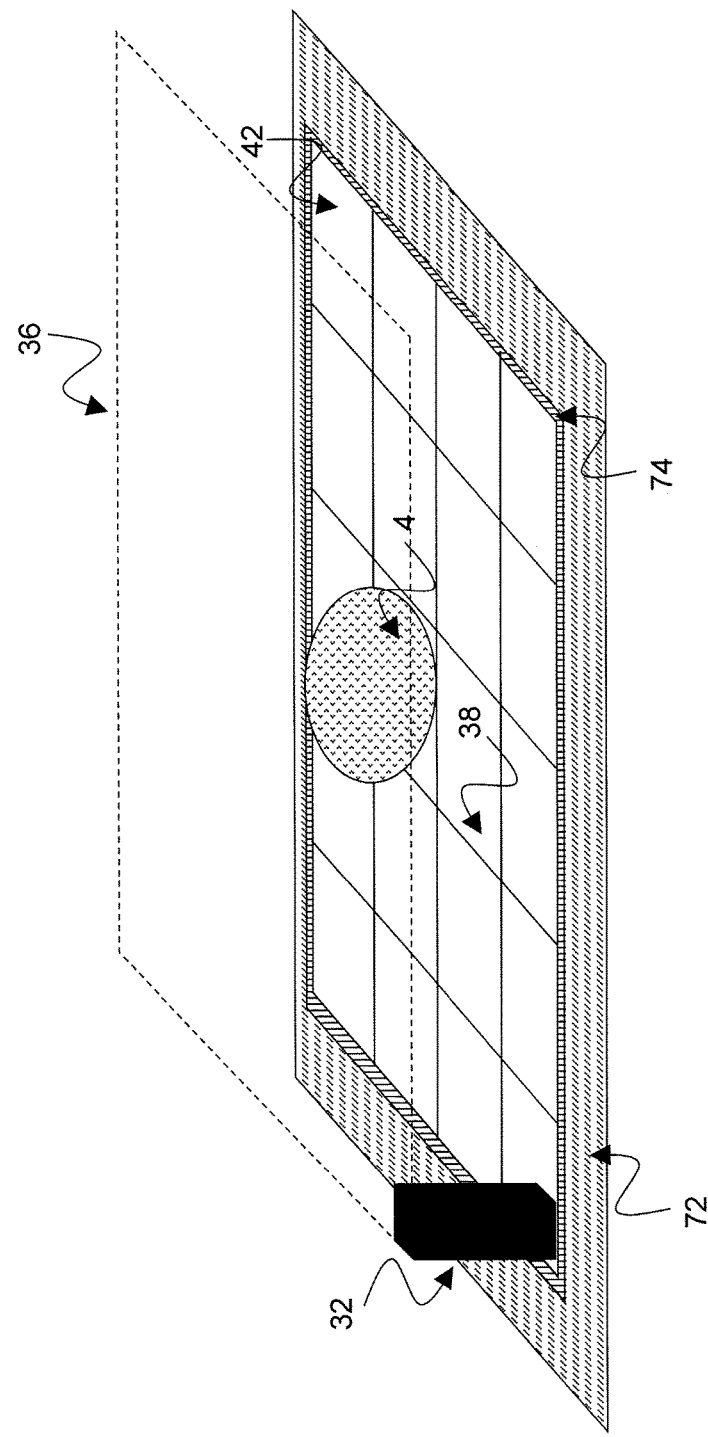
FIG. 4 is a schematic diagram depicting an AM-EWOD device in schematic perspective in accordance with a first and exemplary embodiment of the invention.

FIG. 4 is a schematic diagram depicting an AM-EWOD device in accordance with an exemplary embodiment of the present invention. The AM-EWOD device has a lower substrate 72 with thin film electronics 74 disposed upon the lower substrate 72. The thin film electronics 74 are arranged to drive the array element electrodes 38. A plurality of array element electrodes 38 are arranged in an electrode array 42, having X by Y elements where X and Y may be any integer. A liquid droplet 4, which may comprise any polar liquid and which typically may be ionic and/or aqueous in nature, is enclosed between the lower substrate 72 and a top substrate 36, although it will be appreciated that multiple liquid droplets 4 can be present. A non-polar fluid 34 is used to fill the space between the substrates and may comprise an oil (for example n-dodecane, silicone oil or other alkane oil) or the non-polar fluid 34 may be air.

Figure 5:
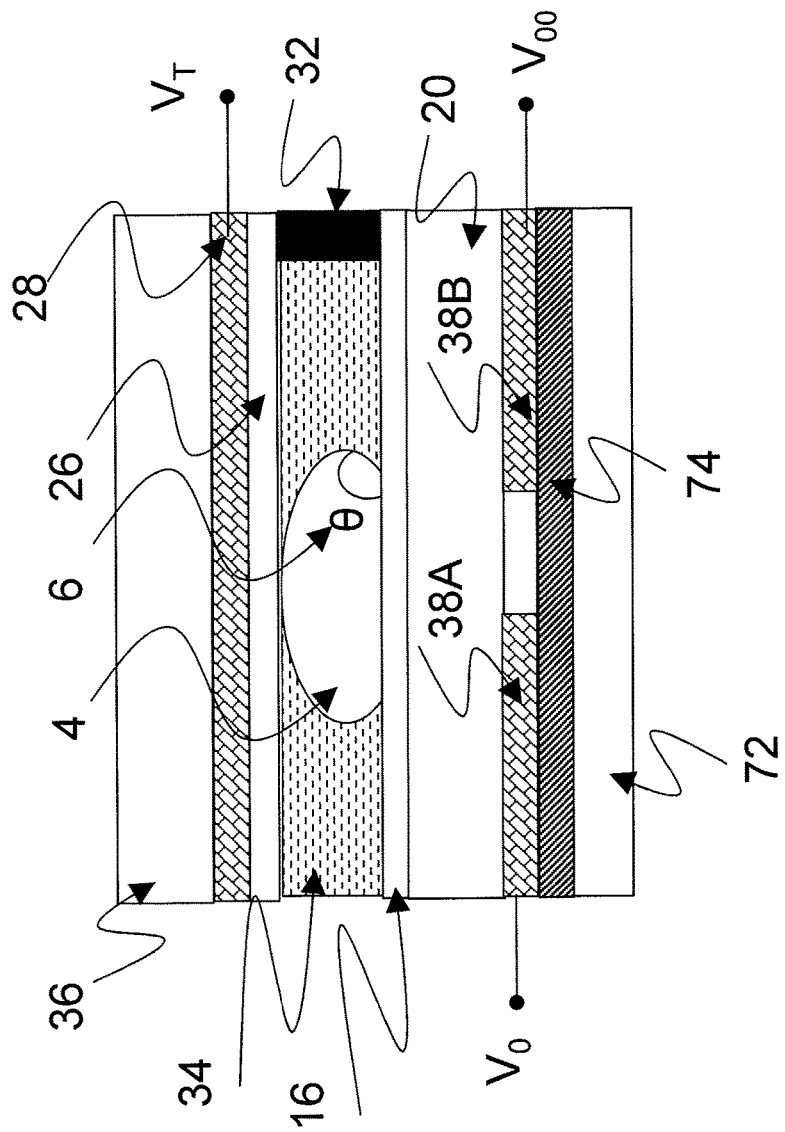
FIG. 5 shows a cross section through some of the array elements of the exemplary AM-EWOD device of FIG. 4.

FIG. 5 is a schematic diagram depicting a pair of the array element electrodes 38A and 38B in cross section that may be utilized in the AM-EWOD device of FIG. 4. The device configuration is similar to the conventional configuration shown in FIG. 1, with the AM-EWOD device further incorporating the thin-film electronics 74 disposed on the lower substrate 72. The uppermost layer of the lower substrate 72 (which may be considered a part of the thin film electronics layer 74) is patterned so that a plurality of the array element electrodes 38 (e.g. specific examples of element electrodes are 38A and 38B in FIG. 5) are realized. These may be termed the array element electrodes 38. The term array element electrode 38 may be taken in what follows to refer both to the physical electrode structure 38 associated with a particular array element, and also to the node of an electrical circuit directly connected to this physical structure. The reference electrode 28 is shown in FIG. 5 disposed upon the top substrate, but may alternatively be disposed upon the lower substrate 72 to realize an in-plane reference electrode 28 geometry. The term reference electrode 28 may also be taken in what follows to refer to both or either of the physical electrode structure and also to the node of an electrical circuit directly connected to this physical structure. The electro-wetting voltage may be defined as the difference in voltage between the element electrode 38 and the reference electrode 28.

FIG. 6A shows a circuit representation of the electrical load 40A between the element electrode 38 and the reference electrode 28 in the case where a liquid droplet 4 is present. The liquid droplet 4 may typically be modelled as resistor 22 and capacitor 24 in parallel. Typically, but not necessarily, the resistance of the liquid droplet 4 may be relatively low (e.g. if the liquid droplet 4 contains ions) and the capacitance of the liquid droplet 4 may be relatively high (e.g. because the relative permittivity of polar liquids is relatively high, e.g. ~80 if the liquid droplet 4 is aqueous). In many situations the droplet resistance is relatively small and so, at the frequencies of interest for electro-wetting, the liquid droplet 4 may function in effect as an electrical short circuit. The hydrophobic coatings 16 and 26 have electrical characteristics that may be modelled as capacitors, and the insulator 20 may also be modelled as a capacitor. The overall impedance between the element electrode 38 and the reference electrode 28 may be approximated by a capacitor whose value is typically dominated by the contribution of the insulator 20 and hydrophobic coatings 16 and 26 contributions, and which for typical layer thicknesses and materials may be of order a pico-Farad in value. The overall value of the electrical load 40A when a liquid droplet 4 completely covers the element electrode 38 may be denoted as $C_T$.

FIG. 6B shows a circuit representation of the electrical load 40B between the element electrode 38 and the reference electrode 28 in the case where no liquid droplet 4 is present. In this case the liquid droplet 4 components are replaced by a capacitor 25 representing the capacitance of the non-polar fluid 34 which occupies the space between the top and lower substrates. In this case the overall impedance between the element electrode 38 and the reference electrode 28 may be approximated by a capacitor whose value is dominated by the capacitance of the non-polar fluid and which is typically small, of order femto-Farads. The overall value of the electrical load 40B when there is no liquid droplet 4 present at the element electrode 38 is dominated by the capacitance of the non-polar fluid 34 and may be denoted as $C_{OIL}$.

For the purposes of driving and sensing, the electrical load 40A/40B overall functions in effect as a capacitor, whose value depends on whether a liquid droplet 4 is present or not at a given element electrode 38. In the case where a droplet is present, the capacitance is relatively high (typically of order pico-Farads), whereas if there is no liquid droplet 4 present the capacitance is low (typically of order femto-Farads). If a droplet partially covers a given electrode 38, then the capacitance may approximately represent the extent of coverage of the element electrode 38 by the liquid droplet 4.

Figure 7:
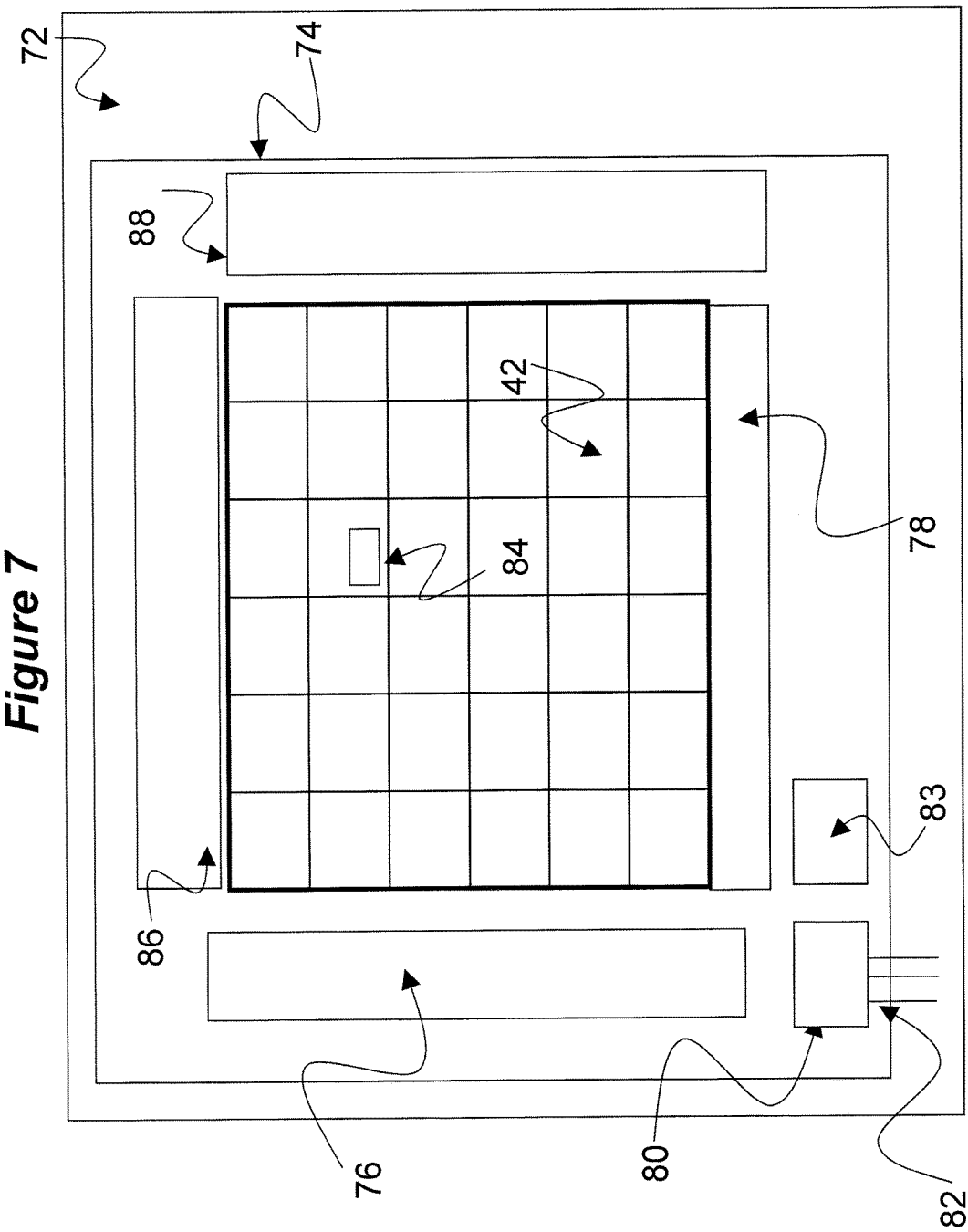
FIG. 7 is a schematic diagram depicting the arrangement of thin film electronics in the exemplary AM-EWOD device of FIG. 4 according to a first embodiment of the invention.

FIG. 7 is a schematic diagram depicting an exemplary arrangement of thin film electronics 74 upon the lower substrate 72. Each element of the electrode array 42 contains an array element circuit 84 (for clarity, just one array element circuit is denoted in FIG. 7) for controlling the electrode potential of a corresponding element electrode 38 and sensing the impedance present at the electrode 38. Integrated row driver circuit 76 and column driver circuit 78 are also implemented in thin film electronics 74 to supply control signals to the array element circuit 84.

A serial interface 80 may also be provided to process a serial input data stream and facilitate the programming of the required voltages to the element electrodes 38 in the array 42. A voltage supply interface 83 provides the corresponding supply voltages, top substrate drive voltages, and other requisite voltage inputs as further described herein. The number of connecting wires 82 between the lower substrate 72 and external drive electronics, power supplies, and other components can be made relatively few, even for large array sizes. Optionally the serial data input may be partially parallelized, for example if two data input lines are used the first may supply data for columns 1 to X/2 and the second for columns (1+X/2) to X with minor modifications to the column driver circuit 78. In this way the rate at which data can be programmed to the array is increased, which is a standard technique used in Liquid Crystal Display driving circuitry.

The thin film electronics also contains additionally sensor row addressing circuitry 88 for supplying control signals to the sensor circuit inputs (e.g. RW) of the array element circuit 84, and column detection circuits 86 for processing and reading out the output signals from the sensor circuit part of the array element circuit 84.

Generally, an exemplary AM-EWOD device that includes thin film electronics 74 is configured as follows. The AM-EWOD device includes a reference electrode 28 (which, optionally, could be an in-plane reference electrode 28) and a plurality of array elements, each array element including an array element electrode (e.g., array element electrodes 38).

Relatedly, the AM-EWOD device is configured to perform a method of controlling an actuation voltage to be applied to a plurality of array elements. The AM-EWOD device includes reference electrode 28 and a plurality of array elements, each array element including an array element electrode 38. The actuation voltage at each array element is defined by a potential difference between the array element electrode 38 and the reference electrode 28. The method of controlling the actuation voltage includes the steps of supplying a voltage to at least a portion of the array element electrodes 38, and supplying a voltage signal to the reference electrode 28.

Relatedly, the AM-EWOD device is further configured to perform a method of sensing the impedance present at a plurality of array elements. Typically this may involve sensing the impedance at a plurality of array element electrodes, with this impedance being a function of the number, size, position and constitution of one or more liquid droplets 4 present within the array.

In general, therefore, an aspect of the invention is an active matrix electro-wetting on dielectric (AM-EWOD) device. In exemplary embodiments, the AM-EWOD device includes a plurality of array elements arranged in an array of rows and columns, each of the array elements including array element circuitry, an element electrode, and a reference electrode. The array element circuitry includes an actuation circuit configured to apply actuation voltages to the element and reference electrodes for actuating the array element, and an impedance sensor circuit configured to sense impedance at the array element electrode to determine a droplet property at the array element. The impedance sensor circuit is configured to be operated by perturbing a potential applied to the reference electrode.

Another aspect of the invention is a corresponding method of operating an active matrix electro-wetting on dielectric (AM-EWOD) device including the steps of: arranging a plurality of array elements in an array of rows and columns, each of the array elements including array element circuitry, an element electrode, and a reference electrode, and the array element circuitry comprises and actuation circuit and an impedance sensor circuit; applying actuation voltages with the actuation circuit to the element and reference electrodes to actuate the array element; perturbing a potential applied to the reference electrode; sensing impedance at the array element electrode with the impedance sensor circuit; and determining a droplet property at the array element based on the sensed impedance.

Figure 8:
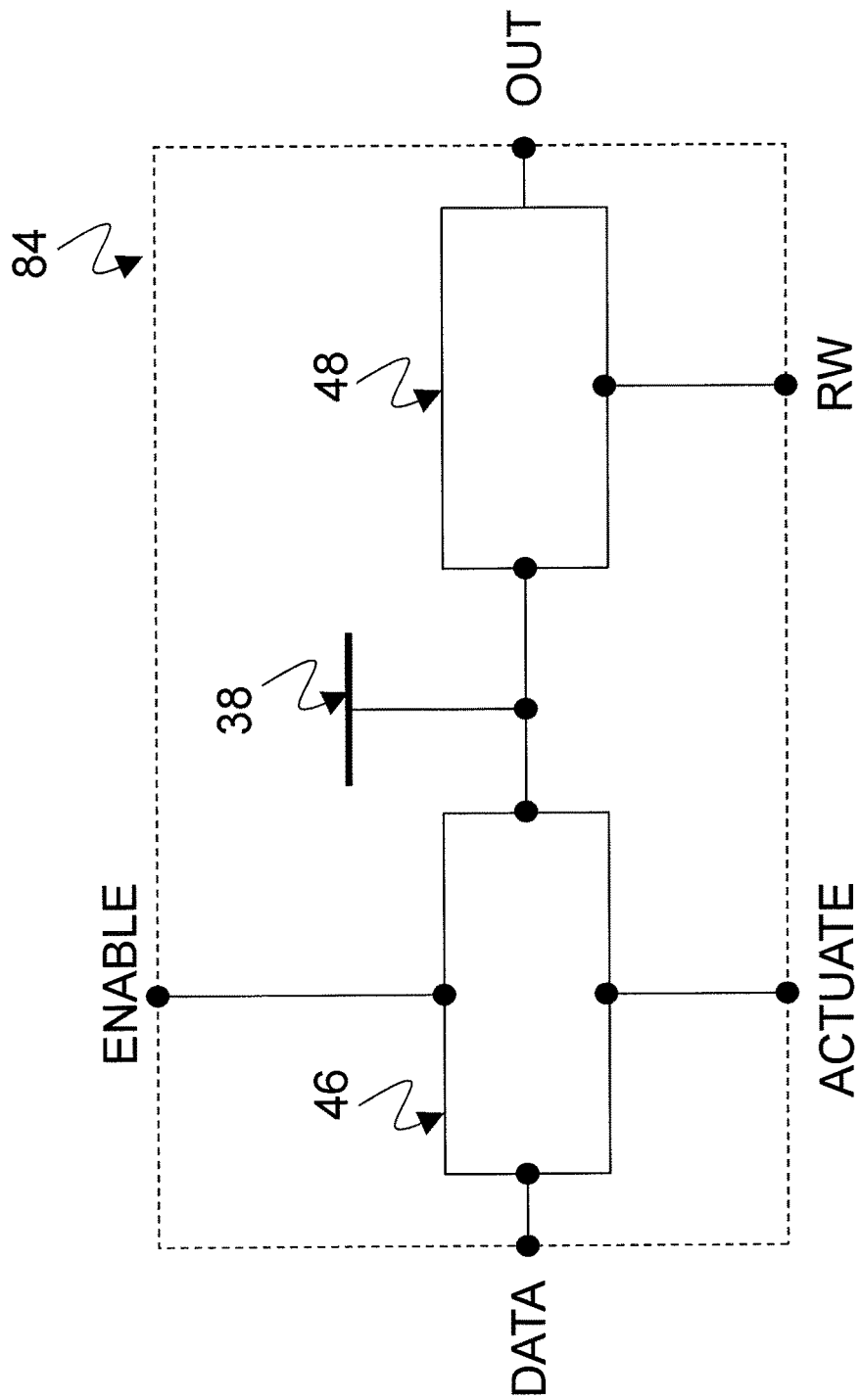
FIG. 8 shows a schematic arrangement of the array element circuit in accordance with a first embodiment of the invention.

FIG. 8 is a schematic diagram showing an example arrangement of thin film electronics 74 in the array element circuit 84. The array element circuit 84 may contain an actuation circuit 46, having inputs ENABLE, DATA and ACTUATE and an output which is connected to an element electrode 38. The array element circuit may further contain a sensor circuit 48. The sensor circuit 48 has an input which is connected to an element electrode, one or more row addressing lines RW and an output which is connected to an output line OUT. Optionally, certain circuit components (e.g. transistors, capacitors) or addressing lines may perform functions associated with the operation of both the actuation circuit 46 and the sensor circuit 48, and these circuit components may be considered to comprise a part of both the actuation circuit and sensor circuit.

Figure 9:
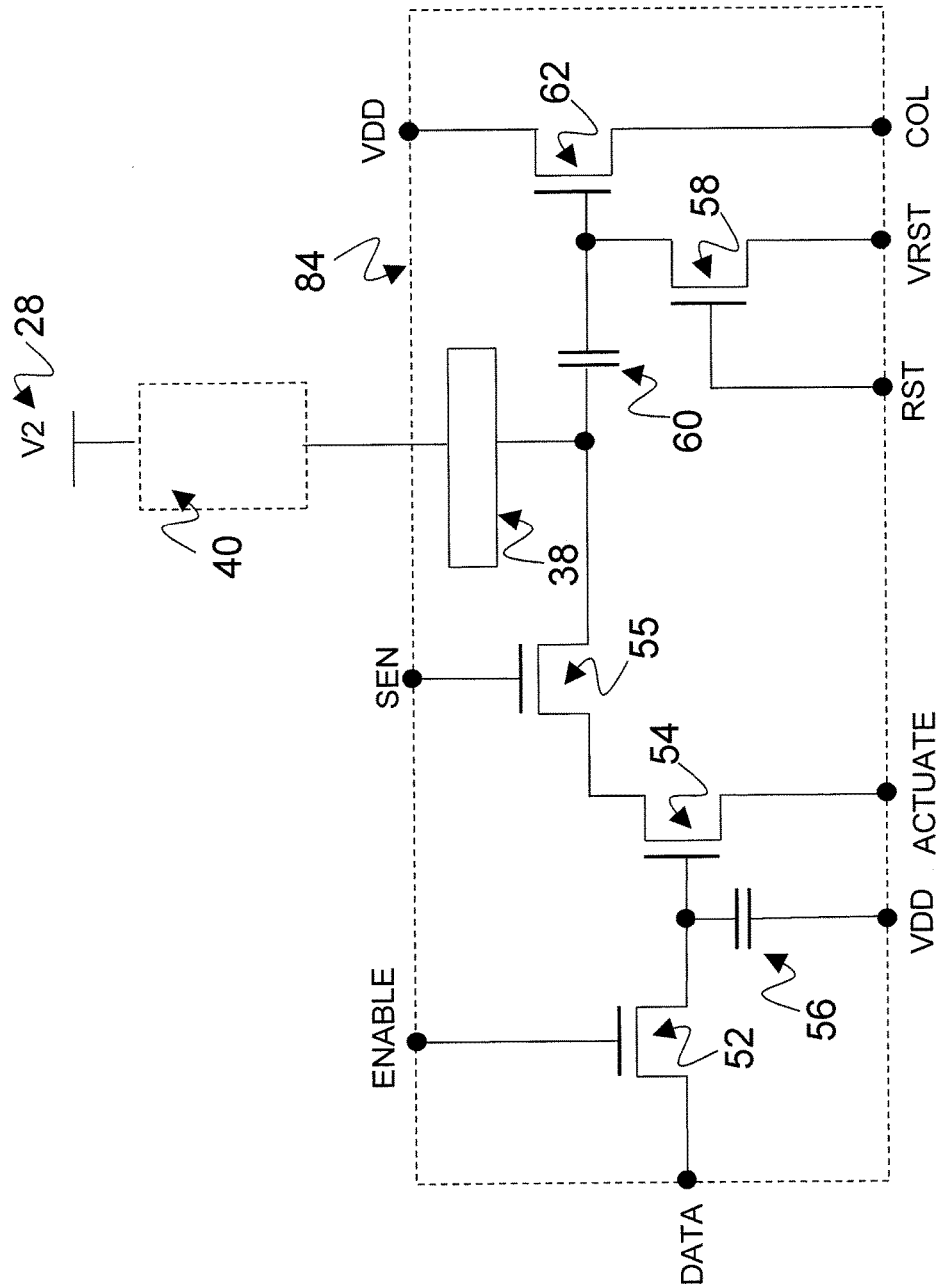
FIG. 9 is a schematic diagram depicting the array element circuit for use in the array elements of the exemplary AM-EWOD device of FIG. 4 according to a first embodiment of the invention.

FIG. 9 shows an array element circuit 84 according to a first embodiment of the invention. The array element circuit comprises n-type transistors 52, 54, 55, 58 and 62, and capacitors 56 and 60. The element electrode 38, the electrical load circuit 40 present at the element electrode 38 and the reference electrode 28 are shown since they play a role in the operation of the array element circuit 84. The reference electrode may thus be considered to form a part of the array element circuit in the description that follows.

The array element circuit 84 may typically perform the functions of:

(i) Programming data to a memory element contained within the actuator circuit and storing said data. The data to be programmed is typically input by means of an addressing line DATA which may be common to all elements within the same column of the array. The programming of data may typically be controlled by an addressing line ENABLE, which may typically be common to all elements within the same row of the array.

(ii) Supplying a voltage signal to the array element electrode 38, for example as supplied by an input signal V1 which is supplied to input ACTUATE, or alternatively switching the element electrode 38 in to a high impedance state.

The array element circuit according to this embodiment and shown in FIG. 9 is connected as follows. The drain of transistor 52 is connected to the input DATA which may be common to all elements in the same column of the array. The gate of transistor 52 is connected to the input ENABLE which may be common to all elements in the same row of the array. The source of transistor 52 is connected to the gate of transistor 54. Capacitor 56 is connected between the gate of transistor 54 and a power supply line VDD which may be common to all elements in the array. The drain of transistor 54 is connected to input signal ACTUATE which may be common to all elements in the array. Transistor 55 is connected between the source of transistor 54 and the element electrode 38. The gate of transistor 55 is connected to the input SEN which may be common to all elements in the same row of the array. Capacitor 60 is connected between the element electrode 38 and the gate of sensing transistor 62. The drain of sensing transistor 62 is connected to a DC voltage source VDD, which may be common to all elements in the array. The source of sensing transistor 62 is connected to output COL which may be common to all elements in the same column of the array. Transistor 58 is connected between the gate of sensing transistor 62 and a voltage supply VRST which may be common to all elements in the array. The gate of transistor 58 is connected to an input signal RST which may be common to all elements in the same row of the array. The actuator circuit 46 comprises transistor 52, transistor 54 and transistor 55 and the terminal connections DATA, ENABLE and ACTUATE. The sensor circuit comprises capacitor 56, capacitor 60, transistor 54, transistor 58, transistor 60, addressing lines RST, VRST and output line COL. The element electrode 38, the electrode load 40 and the reference electrode 28 form a part of both the actuator circuit and sensor circuit.

The operation of the array element circuit 84 is described as follows. The array element circuit performs two functions including (1) actuation and (2) impedance sensing.

(1) Actuation

The actuation circuit has two parts, a memory part and an actuation part. Generally, the memory part is configured for storing data, which may be digital data, corresponding to either an actuated state or an unactuated state of the array element, and the actuation part is configured for supplying the actuation voltages to the element electrode and the reference electrode.

The memory part is explained as follows. Transistor 52 and capacitor 56 together comprise a Dynamic RAM (DRAM) memory element, capable of programming and storing data within the array element circuit 84. To program data, a voltage is programmed onto the column addressing line DATA. The ENABLE line is then taken high to switch transistor 52 on. The voltage on DATA is then programmed onto capacitor 56 and is held there once ENABLE is taken low, irrespective of how the voltage on input line DATA may subsequently be varied after ENABLE is taken low. In typical operation, the programmed voltage may be digital and be approximately $0.5 \times V_{EW}$ (for programming a "0" state, the liquid droplet 4 being unactuated in this state) or $-0.5 \times V_{EW}$ Volts (for programming a "1" state, the liquid droplet 4 being actuated in this state).

The actuation part is explained as follows. During actuation the input SEN is taken high so that transistor 55 is turned on and the source of transistor 54 is in effect connected to the element electrode 38. An AC voltage signal V1 is applied to input ACTUATE and an AC voltage signal V2 is applied to the reference electrode 28. V1 and V2 are arranged to be in anti-phase (e.g. 180 degrees out of phase), or substantially in antiphase (e.g. a high phase angle out of phase for example greater than 90 degrees out of phase, or greater than 135 degrees out of phase or greater than 160 degrees out of phase). Each of V1 and V2 are switched between a low level of $-0.5 \times V_{EW}$ Volts and a high level of $0.5 \times V_{EW}$, V1 is high when V2 is low and vice versa. The element electrode 38 is actuated when a "1" is programmed to the memory (a voltage of $-0.5 \times V_{EW}$ programmed to the gate of transistor 54). In this case transistor 54 is turned on and so voltage signal V1 is transmitted to the element electrode 38. The voltage developed across the electrical load 40 (the electro-wetting voltage) is therefore V1-V2 which is an AC voltage waveform that varies in time between $-V_{EW}$ and $+V_{EW}$.

The element electrode 38 is non-actuated when a "0" is programmed to the memory (a voltage of $0.5 \times V_{EW}$ programmed to the gate of transistor 54). In this case transistor 54 is turned off. The element electrode 38 therefore exists in a high impedance state. There are two different cases to consider where (1) a droplet is present at the element electrode 38 (the electrical load 40A is as FIG. 6A) and (2) no droplet is present at the element electrode 38 (the electrical load 40B is as FIG. 6B).

Case 1—Droplet Present:

Where a droplet is present, the dominant electrical coupling of the element electrode 38 is to the reference electrode 28 via the electrical load 40. As previously explained, the electrical load in this case 40A may be approximated by a capacitor whose value is typically of order a pico-Farad. The capacitance of the electrical load 40A will then dominate over other parasitic impedances in the circuit (e.g. that associated with the source-gate capacitance of transistor 54, typically of order femto-Farads). The electrical potential of the element electrode 38 will therefore track the potential of the reference electrode 28, and will thus correspond to a good approximation to the voltage signal V2. This being the case, the potential developed between the element electrode 38 and the reference electrode 28 will approximately be zero. The liquid droplet 4 will therefore be in a non-actuated state, the contact of the liquid droplet 4 with the hydrophobic coating 16 will not be energized and the liquid droplet 4 will not experience an electro-wetting force.

Case 2—No Droplet Present:

When no liquid droplet 4 is present, the capacitance between the element electrode 38 and the reference electrode 28 is very small as previously explained. The element electrode 38 is therefore now in a high impedance state and its effective potential is only poorly defined, being dependent on the multiple small parasitic capacitances and resistances within the circuit (e.g. the small electrical load 40B capacitance to the reference electrode 28, the small parasitic source to gate capacitance of transistor 54, and the large off resistance of transistor 54). It may therefore be unclear what the effective potential of the element electrode 38 is and therefore the extent to which the element electrode 38 remains effectively non-actuated.

However, the situation is such that, even with the potential of the element electrode 38 being poorly defined in CASE 2, the device can still support the correct transport of liquid droplets 4. This is because if any liquid droplet 4 does encroach into the position of the non-actuated element electrode 38, there is associated with this a significant increase in the capacitance between the reference electrode 28 and element electrode 38B. In this situation, the potential of the element electrode 38B becomes approximately that of the reference electrode 28 by means of the capacitive coupling through the liquid droplet 4. In other words, the situation begins to resemble more closely CASE 1 than CASE 2, and the element electrode 38 is in a non-actuated state. This effect is explained in further detail in co-pending application UK Application GB1500261.1.

An advantage of the array element actuation circuit and method of driving described in this embodiment is that the electro-wetting voltage in the actuated state is switched between $+V_{EW}$ and $-V_{EW}$. Therefore, AC electro-wetting is implemented. This is achieved whilst only requiring the array element circuit 84 to switch approximately $V_{EW}$ between the terminals of any transistor in the circuit (for the reasons why this may only be approximate see the more detailed description in UK Application GB1500261.1). This is an important advantage of the invention, since typically electro-wetting requires relatively high voltages to actuate the liquid droplets 4, whilst typical electronics technologies for realizing the thin film electronics 74 impose limitations on the maximum voltage applied to the transistors (e.g. due to reliability concerns).

(2) Impedance Sensor

The operation of the impedance sensor function is partially based on the principles of U.S. Pat. No. 8,653,832 incorporated by reference.

The circuit works in essence by comparing the impedance of the electrical load 40 with the other circuit impedances connected to the element electrode 38, comprised of capacitor 60, parasitic capacitance associated with transistor 55 and other parasitic capacitances presented at the element electrode 38. In exemplary embodiments, therefore, the impedance sensor circuit includes the capacitor 60, and the impedance at the array element is based on a change of a sensing voltage at the capacitor. The impedance sensor circuit further includes the two transistors 58 and 62 for initially setting the sensing voltage at the capacitor 60.

A principal difference of the current invention compared to U.S. Pat. No. 8,653,832 is that the array element does not contain a row select line (the row addressing line named RWS in U.S. Pat. No. 8,653,832) or a capacitor (named Cs in U.S. Pat. No. 8,653,832) which is connected between the RWS line and the element electrode in U.S. Pat. No. 8,653,832.

According the present invention, the method of implementing a row select operation and potential divider action is accomplished by perturbing the voltage V2 supplied to the reference electrode 28. This results in a perturbation of the potential at the element electrode 38, which is in accordance with the impedance associated with the electrical load 40, and which in turn depends on the presence, absence, size and constitution of any liquid droplet 4 present at the array element being sensed. The reference electrode 28 is a global signal and perturbing the voltage signal V2 results in the simultaneous perturbation of the element electrode 38 of every element in the array. However, for array sensing to be achieved it is also necessary to incorporate a row select mechanism into the operation of the array element circuit 84, in order that the resulting current at the output COL common to each element in the same column of the array derives only from the array elements in that column. Accordingly, in the present invention this is achieved by applying appropriate timings to the reset (RST) signal which may de-activate sensing transistor 62 in elements of the rows not being sensed. Accordingly, in the present invention the signal RST performs the functions of both reset and row selection. The device, therefore, includes a common addressing line for reset and row select, and the impedance sensor circuit is operated by sending both a reset signal to all rows in the array, and a row selection signal for selecting a row in the array, over the common addressing line. In this manner, by virtue of perturbing the voltage to the reference electrode, the impedance sensor circuit further is operated by perturbing a potential applied to the common addressing line.

Figure 10:
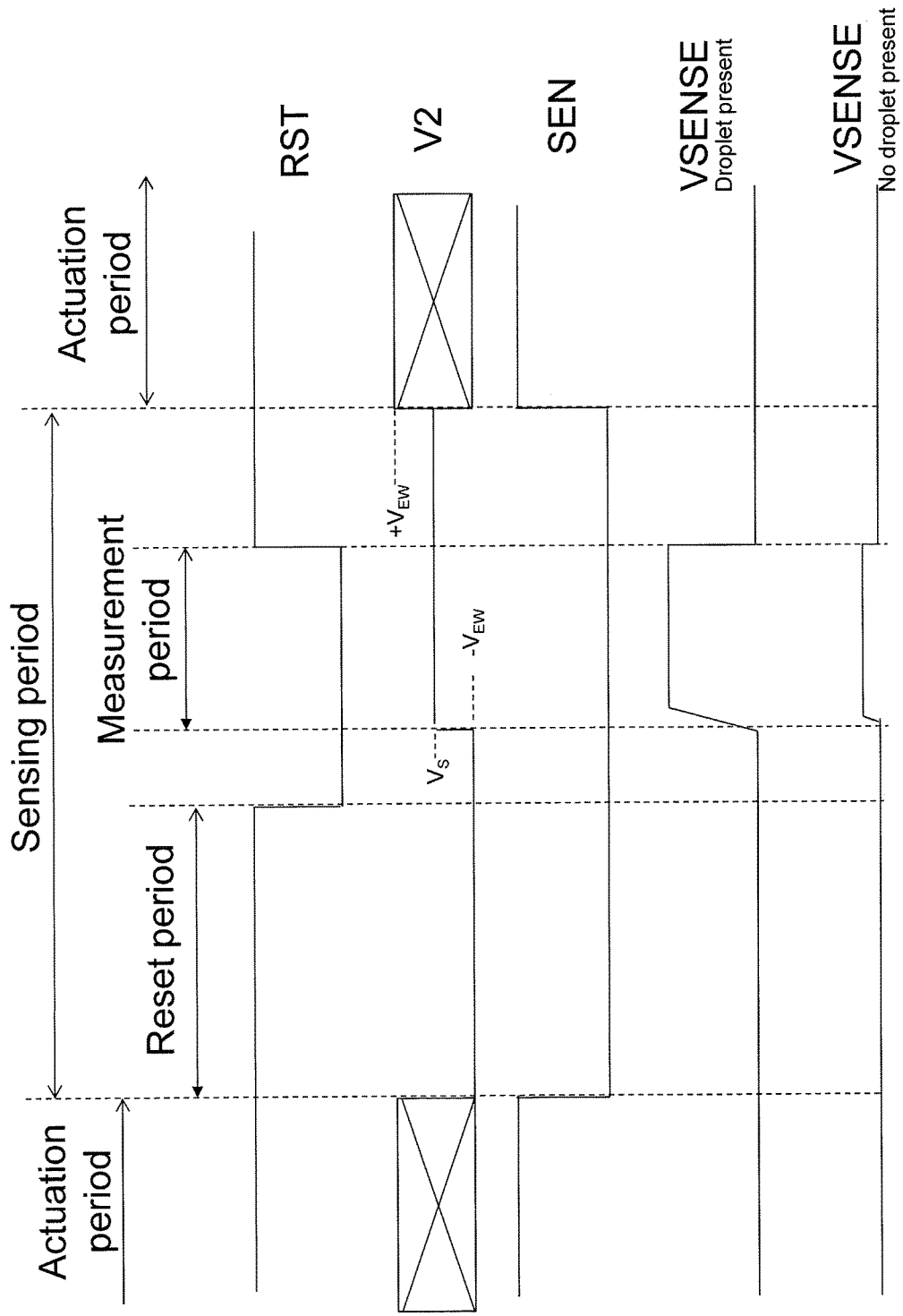
FIG. 10 is a timing diagram for driving the array element circuit of FIG. 9 according to a first embodiment of the invention.

The operation of the impedance sensor function is further explained in detail with reference to the exemplary timing diagram shown in FIG. 10, showing the timings of the addressing signals RST, V2 and SEN during the sensor operation for the row being sensed. Also shown in FIG. 10 is the internal potential at the gate of sensing transistor 62, denoted VSENSE in the case where a droplet is present at the location of the array element and in the case where no droplet is present at the location of the array element. The corresponding timings for the rows not being sensed (all other rows in the array) are shown in FIG. 10a.

Figure 10A:
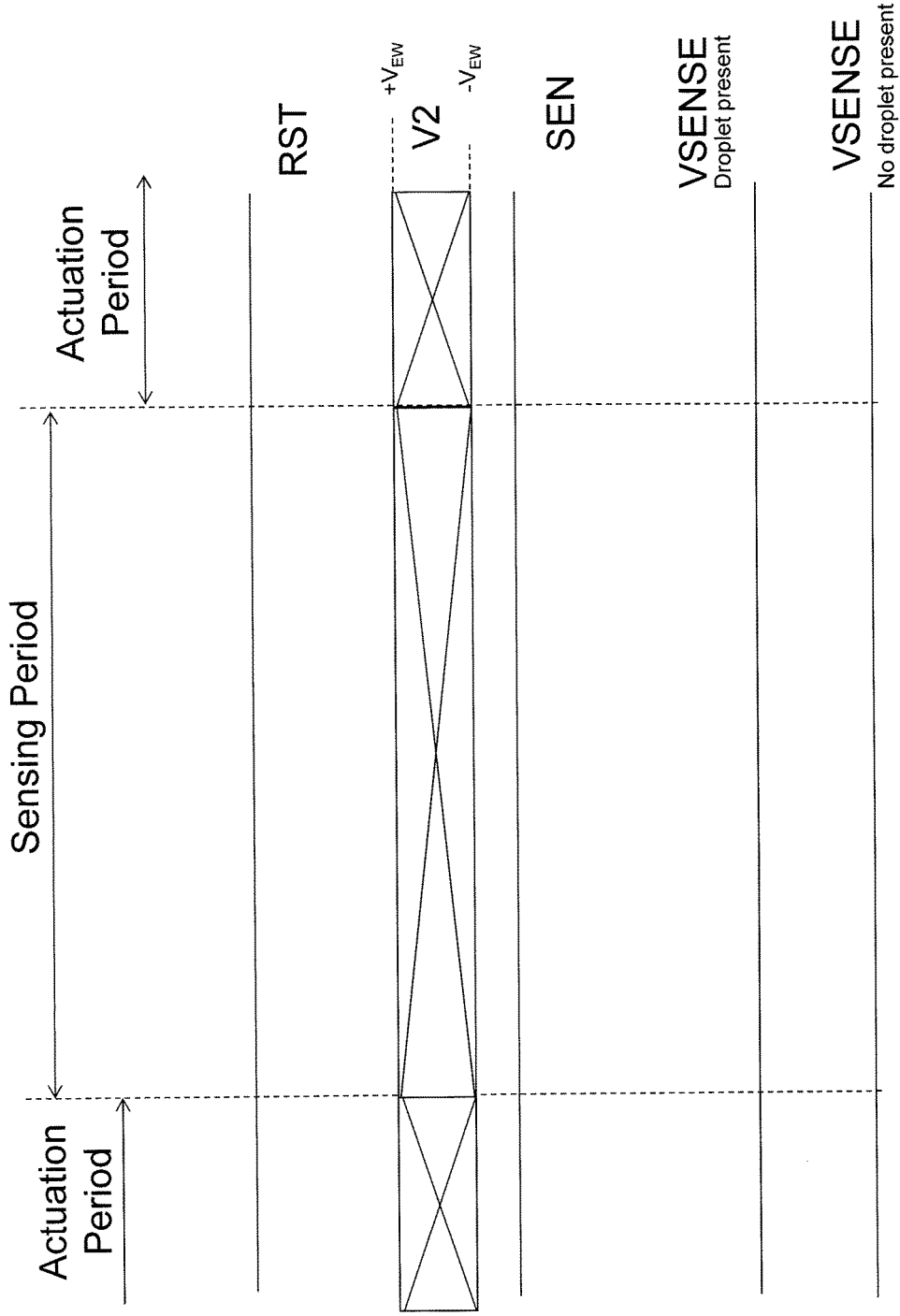
FIG. 10a is a further timing diagram for driving the array element circuit of FIG. 9 according to a first embodiment of the invention.

Operation of the array element circuit 84 for the row being sensed is described as follows:

During the Actuation Period, RST may be maintained either high or low (shown maintained high in FIGS. 10 and 10a). SEN is maintained high so that the source of transistor 54 is connected to the element electrode 38. Signals ACTUATE and V2 are modulated as previously described so as to implement an AC method of actuation. During actuation V2 could be in either a high or low state in accordance with the method of driving the circuit to achieve actuation, as previously described. The "either high or low" state of V2 is shown represented as a cross (X) on the timing diagrams of FIGS. 10 and 10a.

At the end of the Actuation Period, signal SEN is taken to a low level on the row being sensed. This has the effect of disconnecting the ACTUATE signal from the element electrode 38 for the row of the array being sensed. Accordingly, the actuator circuit includes isolating elements configured to isolate the element electrode from the actuation voltage during operation of the impedance sensor circuit. In the embodiment of FIG. 9, the sensor input line (SEN) is provided for actuating the impedance sensor circuit, and the isolating elements include the transistor 55 between the actuation circuit and the impedance sensor circuit that receives an input from the sensor input line. For the rows of the array not being sensed, SEN may be maintained high and these rows may continue to be actuated whilst these rows are not being sensed.

At the end of the Actuation Period V2 is taken to the low state (potential is $-V_{EW}$).

As the Sensing Period commences, the reset signal RST continues to be held high for a period of time which may be denoted the Reset Period. During the Reset Period transistor 58 is turned on and the potential at the gate of sensing transistor 62, VSENSE, is charged (or discharged) to the reset potential, VRST (in such case that the potential was not at this value already). The value of VRST is chosen such that sensing transistor 62 is turned off and therefore no current is sourced through sensing transistor 62.

Following the conclusion of the Reset Period, RST is taken low, but only on the row of the array that is being sensed. On all other rows of the array (rows not being sensed) RST is maintained at the high level. For the array elements in all the rows not being sensed, transistor 58 remains switched on and the potential VSENSE at the gate of sensing transistor 62 maintains pinned to VRST.

As a result of RST being taken low on the row being sensed, transistor 58 is turned off. The potential at the gate of sensing transistor 62 VSENSE remains at substantially VRST with this node now in a high impedance state. For the rows within the array that are not being sensed, RST remains turned on. For the array elements in these rows VSENSE remains pinned at VRST.

At the start of the Measurement Period, the voltage signal V2 applied to the reference electrode 28 is now increased from $-V_{EW}$ to a value $V_S$ (which may be the same as, greater than or less than $+V_{EW}$). As a result a potential divider is formed between the load circuit 40, capacitor 60 and any parasitic impedance at the element electrode 38, denoted $Z_{PAR}$. As a result the potential at the element electrode 38 $V_{EE}$ is perturbed by an amount $\Delta V_{EE}$ given by approximately $$\Delta V_{EE} = \frac{Z_C Z_{PAR}}{Z_L(Z_C + Z_{PAR})}(V_S + V_{EW}) \qquad \text{(equation 2)}$$

where $Z_C$, $Z_L$ denote respectively the impedances of capacitor 60 and the load circuit 40. In the case where a liquid droplet 4 is present at the element electrode 38 and making the simplifying assumptions that the droplet is relatively conductive and the dominant parasitic impedance present at the element electrode 38 is capacitive and of value $C_{PAR}$.

In the case where there is no liquid droplet 4 present at the element electrode 38 the capacitance associated with load circuit 40 is approximately $C_{OIL}$ as previously described. In this case the potential at the element electrode 38 is perturbed by is approximately:

$$\Delta V_{EE} = \left[\frac{C_{OIL}}{(C_{OIL} + C_C + C_{PAR})}\right](V_S + V_{EW}) \qquad \text{(equation 3)}$$

Since $C_{OIL}$ is typically small (typically ~fF), the square bracketed term is also small and may be approximately zero and so $\Delta V_{EE}$ may in this case also be small.

In the case where there is a liquid droplet 4 present at the element electrode 38, the capacitance associated with the load circuit 40 is approximately $C_{INS}$ as previously described. In this case the potential at the element electrode 38 is perturbed by is approximately:

$$\Delta V_{EE} = \left[\frac{C_{INS}}{(C_{INS} + C_C + C_{PAR})}\right](V_S + V_{EW}) \quad \text{(equation 4)}$$

Since $C_{INS}$ is typically large (for example compared to $C_C$ and $C_{PAR}$) the square bracketed term may approach 1 and the perturbation of the potential at the element electrode 38 may be approximately $V_S + V_{EW}$.

The perturbation of the potential at the element electrode 38 further results in a perturbation of the potential at the gate of sensing transistor 62, since the two nodes are AC coupled by means of transistor 60. Denoting the parasitic capacitance at the gate of sensing transistor 62 (e.g. due to transistors 58 and 62) as CPAR2, the potential at the gate of sensing transistor 62 is perturbed so as to become:

$$V_{SENSE} = V_{RST} + \left[\frac{C_C}{(C_C + C_{PAR2})}\right](\Delta V_{EE}) \quad \text{(equation 5)}$$

where $\Delta V_{EE}$ is as shown in equation 3 and 4 for the no droplet present/droplet present cases.

The overall result of modulating the voltage signal V2 is therefore to perturb the potential VSENSE, by a large amount in the case where a liquid droplet 4 is present at the element electrode 38, and by a small amount if no liquid droplet 4 is present at the element electrode 38. The result of this perturbation is that sensing transistor 62 may be turned on to a greater or lesser extent in accordance with the magnitude of the perturbation of VSENSE resulting in an output current through COL being sunk. The current through the output COL during the measurement period may typically be measured by means of standard circuitry in the column detection circuit 86. This may be done using standard techniques for CMOS image sensor as is very well known.

At the end of the Measurement Period RST is taken high. Transistor 58 is thus turned on once again and the potential at the gate of sensing transistor 62 again returns to the rest potential VRST and sensing transistor 62 is switched off.

At the conclusion of the Sensing Period, SEN may be taken high and modulation of V2 resumed and the circuit returns to actuation mode.

For the rows of the array not being sensed, the voltage signal applied to V2 results in the same perturbation in the potential of the element electrode 38 as described in equations 3 and 4. However, for these rows of the array, RST remains turned on for the duration of the Sensing Period. This has the effect of pinning the potential at the gate of sensing transistor 62 to VSENSE, regardless of the perturbation of the element electrode 38 $\Delta V_{EE}$. In this way the RST connection constitutes a common addressing line that performs the function of selecting the row to be sensed (row select). The inventors have realized that the common addressing line RST thus can perform the dual function of resetting the potential of VSENSE and controlling the selection of the row within the array.

Typically in operation, the whole array may be sensed a row at a time, by applying the timings of FIG. 10 to each row in turn, whilst applying the timings of FIG. 10a to all other rows in the array. In this method an impedance "image" may be read out from the device which may show the position, size and constitution of the liquid droplets 4 in the array.

It will be noted from the description above that an important feature of the circuit is that the gate of sensing transistor 62 is AC coupled to the element electrode 38. An advantage of this arrangement is that the potential at the gate of sensing transistor 62 $V_B$ (as produced by the perturbing effect of the RWS pulse and the subsequent potential dividing) is independent of the initial voltage $V_0$ of the element electrode 38. A further advantage is that the total range of voltage that may be produced at the gate of sensing transistor 62 may be much smaller than the range of voltages that may be produced at the element electrode 38. Therefore, sensing transistor 62 and transistor 58 may be formed from a standard low voltage device construction (e.g. 5 Volt or 8 Volt transistors).

It may be noted that compared to the prior art circuits described in U.S. Pat. No. 8,653,832 and UK Application GB1500261.1, the polarity of the output signal is reversed. This is a feature of the perturbative voltage signal that operates the potential divider being applied across the load circuit 4, this pulse being divided down at the element electrode 38 by other capacitances present at this node. As a result the larger the capacitance associated with the load circuit 40, the larger the increase in the potential at the gate of sensing transistor 62 and the larger the output current through COL. By contrast, in U.S. Pat. No. 8,653,832 and UK Application GB1500261.1 the perturbative voltage signal is applied across a capacitor connected to a row select line (RWS) and is divided down by the load circuit. In such case, the larger the capacitance associated with the load circuit 40, the smaller the increase in the potential at the gate of sensing transistor 62 and the smaller the output current through COL.

A significant advantage of this embodiment is that the array element circuit 84, having both an actuate and sensor function, has been implemented with a minimal number of circuit components and addressing lines. In particular, the removal of the RWS line and the capacitor it connects to from the array element circuit results in a substantially smaller array element circuit, for example compared to the prior art circuit of FIG. 3.

Reducing the complexity and the number of transistors in the array element circuit 84 is advantageous for several reasons:

Smaller array elements/element electrodes 38 may be realized. Typically it is often the case that the minimum achievable array element size is set by the limitations of the thin film electronics and the design for fabrication requirements (design rules) dictating the layout of the array element circuit 84 in the thin film electronics. A simpler circuit (fewer transistors) therefore enables smaller array elements to be designed and fabricated. Smaller array elements may be advantageous for at least three reasons. Firstly, smaller liquid droplets 4 may be manipulated. This is particularly important for applications involving the manipulation or analysis of single cells or single molecules. Secondly, if using larger liquid droplets 4, sub-droplet resolution of actuation may be achieved. This may improve the capabilities of the device, for example enabling more accurate splitting or faster mixing. Thirdly, smaller array element sizes facilitate the design and fabrication of a very large format array which may have a total number of array elements in excess of 1 million and which may be able to manipulate tens to hundreds of thousands of liquid droplets 4, simultaneously and independently.

- A smaller and simpler design of array element circuit 84 may facilitate increased manufacturing yield and hence lower cost of the device.
- A smaller and simpler design of array element circuit 84 may facilitate increased optical transparency of the device. This may be important, for example, if the device is being used to implement chemical or biochemical tests that result in a change in the optical properties (e.g. fluorescence, absorbance) of one or more liquid droplets 4, and that by measurement of this change in optical property the device may be read out.
- A smaller and simpler design of array element circuit 84 may free up space within the array element to implement other electronic functions into the array element, e.g. temperature sensing, bio-sensing and like operations.

A further advantage of the invention is that it realizes a sensor having improved linearity compared to the prior art circuits. In the prior art circuits, the change in potential at the gate of sensing transistor 62 assumes a reciprocal relationship with the capacitance presented at the element electrode 38. In the present invention the potential at the gate of sensing transistor 62 has an approximately linear dependence on the capacitance presented at the element electrode 38. This improved linearity has the advantages that the partial presence of a liquid droplet 4 may be more accurately determined. This may result in the size of droplets being measured more accurately than was possible using the arrangements described in prior art.

A further advantage of this embodiment is that it only requires n-type transistors to implement the array element circuit. This may therefore facilitate fabrication of the AM-EWOD device with a simpler and lower cost fabrication process. This embodiment may also therefore be particularly suitable for AM-EWOD devices fabricated using a single channel thin film transistor fabrication process, for example based on amorphous silicon TFTs or oxide TFTs (e.g. zinc oxide or indium-gallium-zinc-oxide TFTs).

Figure 11:
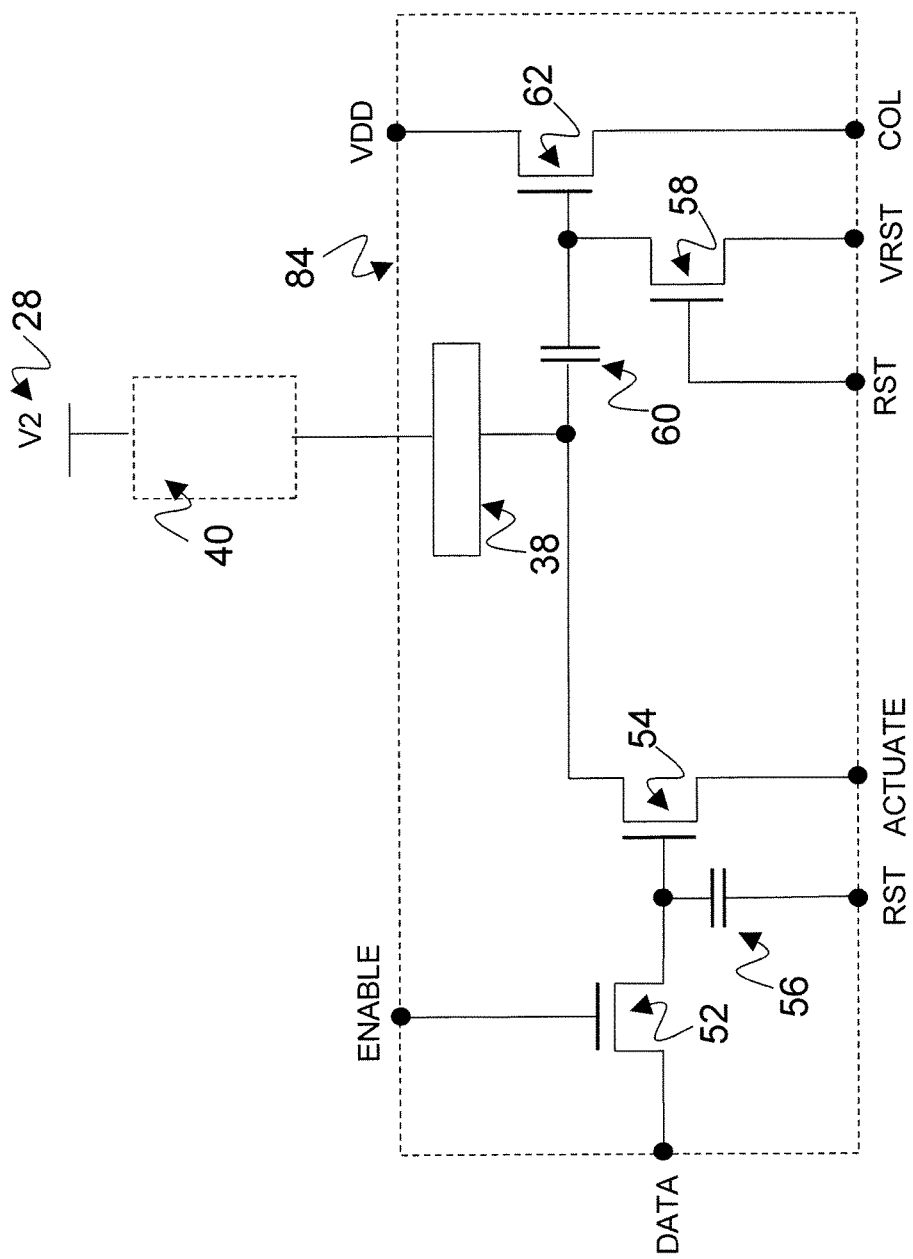
FIG. 11 is a schematic diagram depicting the array element circuit for use in the array elements of the exemplary AM-EWOD device of FIG. 4 according to a second and exemplary embodiment of the invention.

An AM-EWOD device according to a second embodiment of the invention is comparable to the first embodiment except that an alternative design of array element circuit is employed as shown in FIG. 11. The topology of the array element circuit is comparable to the first embodiment with the exception that transistor 55 and supply line SEN are removed from the circuit, and an isolating capacitor 56 is now connected between the gate of transistor 54 and the supply line RST (the common reset/row select addressing line) to act as the isolating element for isolating the element electrode from the actuation voltage during operation of the impedance sensor circuit.

Figure 12:
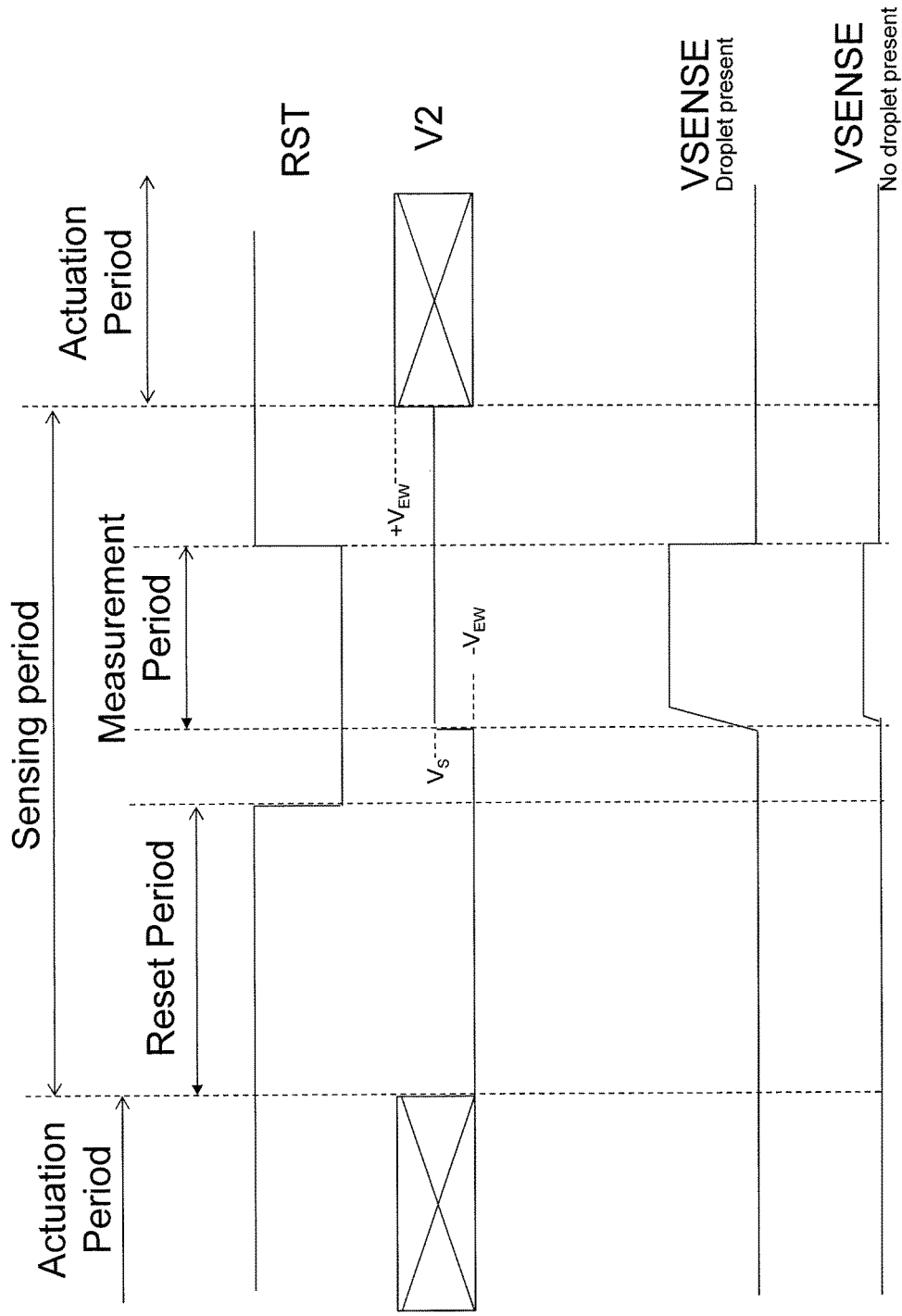
FIG. 12 is a timing diagram for driving the array element circuit of FIG. 11 according to a second embodiment of the invention.

The operation of the array element circuit is explained with reference to the timing diagram of FIG. 12 showing the timings of the signals applied to RST and V2 on the row of the array being sensed associated with the operation of the second embodiment, and the internal potential VSENSE generated at the gate of sensing transistor 62 in the case where a liquid droplet 4 is present and in the case where no liquid droplet 4 is present at the array element. The timing diagram of FIG. 12 is identical to that of FIG. 10 except in this case there is no signal SEN.

The operation of the array element circuit is comparable to that as previously described for the first embodiment with the exception that a different method is used to isolate the element electrode 38 from the voltage supply ACTUATE during the Measurement Period. It will be appreciated that in the description of the first embodiment of the invention, transistor 54 is turned off, thus isolating the element electrode 38 from the signal ACTUATE for the duration of the Measurement Period. If this was not the case, the potential of the element electrode 38 would remain substantially pinned to the potential of ACTUATE and the potential divider would not work as described.

According to the second embodiment of the invention, the inventors have realized that the disconnection of the actuate signal from the element electrode 38 may be achieved without recourse to an additional isolation transistor (transistor 55 in the first embodiment). However, in the array element circuit of the second embodiment, transistor 54 is arranged to fulfill the additional function of effecting the isolation of ACTUATE from the element electrode 38 during the Measurement Period. This is achieved by charge injection across an isolating capacitor 56 connected to the RST line (the common addressing line). At the end of the Reset Period, RST is taken low. As well as having the effects previously described, the falling edge of the RST signal performs the additional function of decreasing the potential at the gate of transistor 54. This has the effect of turning transistor 54 off (in the case it was not already turned off), thus isolating ACTUATE from the element electrode 38. In all other respects the actuation and sensing operations proceed as previously described.

In this embodiment of the invention the signal RST thus has three functions:
- Reset of the potential at the gate of sensing transistor 62 at the start of sensor operation.
- Selection of the row of the array being sensed.
- Charge injection across capacitor 56 to ensure transistor 54 is turned off during the sense operation.

An additional advantage of the second embodiment compared to the first embodiment is that the array element circuit of the second embodiment has one fewer transistor and one fewer addressing line. This may result in smaller array elements with the advantages previously described including smaller droplet sizes, larger format arrays and higher manufacturing yield.

Figure 13:
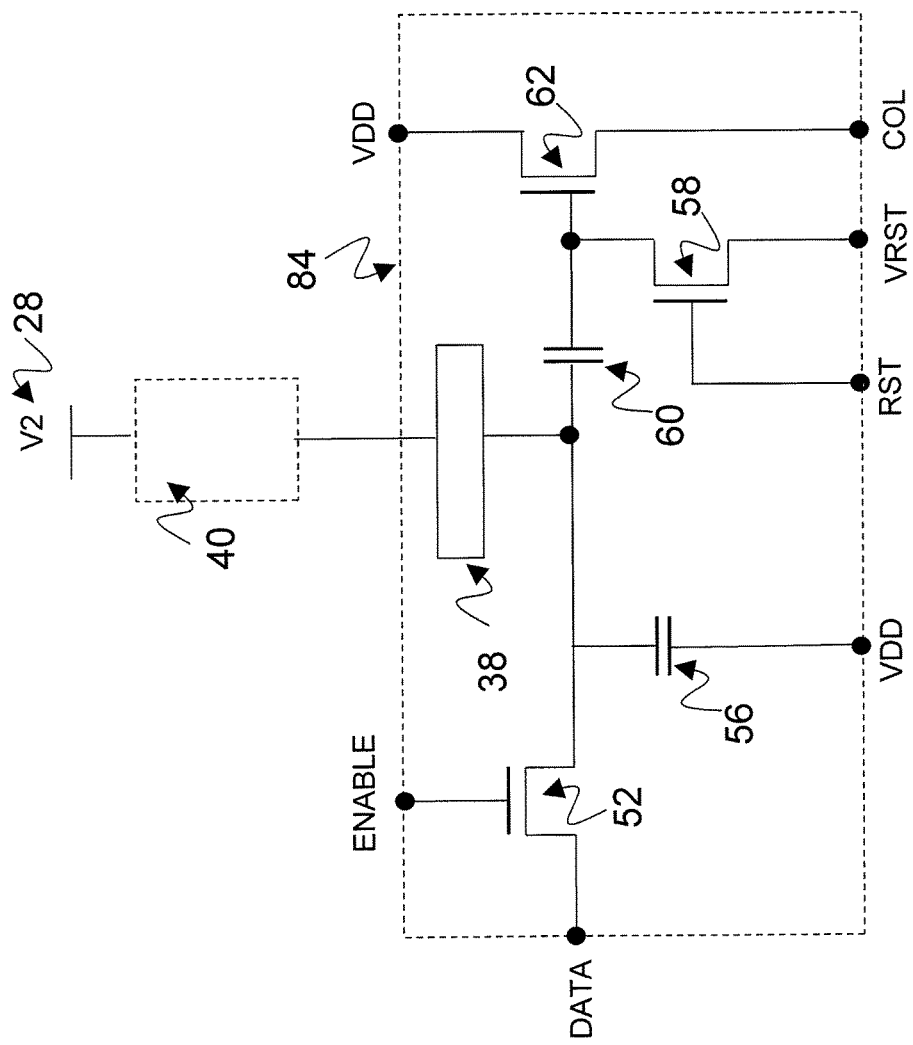
FIG. 13 is a schematic diagram depicting the array element circuit for use in the array elements of the exemplary AM-EWOD device of FIG. 4 according to a third and exemplary embodiment of the invention.

An AM-EWOD device according to a third embodiment of the invention is comparable to the first embodiment with an alternative design of the array element circuit as shown in FIG. 13. The connectivity of the array element circuit is described as follows:

The drain of transistor 52 is connected to the input DATA which may be common to all elements in the same column of the array. The gate of transistor 52 is connected to the input ENABLE which may be common to all elements in the same row of the array. The source of transistor 52 is connected to the element electrode 38. Capacitor 56 is connected between the element electrode 38 and a power supply line VDD which may be common to all elements in the array. The capacitor 56 acts as an isolating capacitor that acts as the isolating element for isolating the element electrode from the actuation voltage during operation of the impedance sensor circuit. Capacitor 60 is connected between the element electrode 38 and the gate of sensing transistor 62. The drain of sensing transistor 62 is connected to a DC voltage source VDD, which may be common to all elements in the array. The source of sensing transistor 62 is connected to output COL which may be common to all elements in the same column of the array. Transistor 58 is connected between the gate of sensing transistor 62 and a voltage supply VRST which may be common to all elements in the array. The gate of transistor 58 is connected to an input signal RST which may be common to all elements in the same row of the array. The actuator circuit 46 comprises of transistor 52 and the terminal connections DATA and ENABLE. The sensor circuit comprises capacitor 56 and capacitor 60, sensing transistor 62, transistor 58, addressing lines RST, VRST and output line COL. The element electrode 38, the electrical load 40 and the reference electrode 28 form a part of both the actuator circuit and sensor circuit.

The operation of the array element is similar to as previously described and as described in UK Application GB1500260.3 and in U.S. Pat. No. 8,653,832 incorporated by reference. Transistor 52 and the capacitors connected to the element electrode 38 (capacitor 56 and capacitor 60) function in combination as a Dynamic RAM memory element. The actuation state may be programmed and stored as a potential at the element electrode 38 as described in U.S. Pat. No. 8,653,832. According to the operation of this embodiment, the impedance sensor functions by perturbing the potential of the signal V2 supplied to the reference electrode 28 in the same way as previously described for the first embodiment of this invention. Operation of the sensing function is then identical to as previously described with the exception that the perturbation in the element electrode 38 is now given by equation 6 (in the case of no liquid droplet 4 being present at the location of the array element) and by equation 7 (in the case where a liquid droplet 4 is present). $C_X$ denotes the capacitance of the additional capacitor 56 that is present in the circuit compared to the first embodiment.

$$\Delta V_{EE} = \left[\frac{C_{OIL}}{(C_{OIL} + C_C + C_X + C_{PAR})}\right](V_S + V_{EW}) \quad \text{(equation 6)}$$

$$\Delta V_{EE} = \left[\frac{C_{INS}}{(C_{INS} + C_C + C_X + C_{PAR})}\right](V_S + V_{EW}) \quad \text{(equation 7)}$$

As in previous embodiments, the RST signal provides the dual function of resetting the potential at the gate of sensing transistor 62, and as functioning as a row select transistor.

An advantage of the third embodiment is that it contains fewer circuit components than the first and second embodiments, requiring only three transistors for the implementation of both the actuation and sensor functions.

According to a variant of the third embodiment, capacitor 56 may be omitted from the circuit so that the programmed actuation voltage is stored entirely on capacitor 60. This has the advantage that it may further reduce the size of the array element circuit with associated advantages as previously described.

Figure 14:
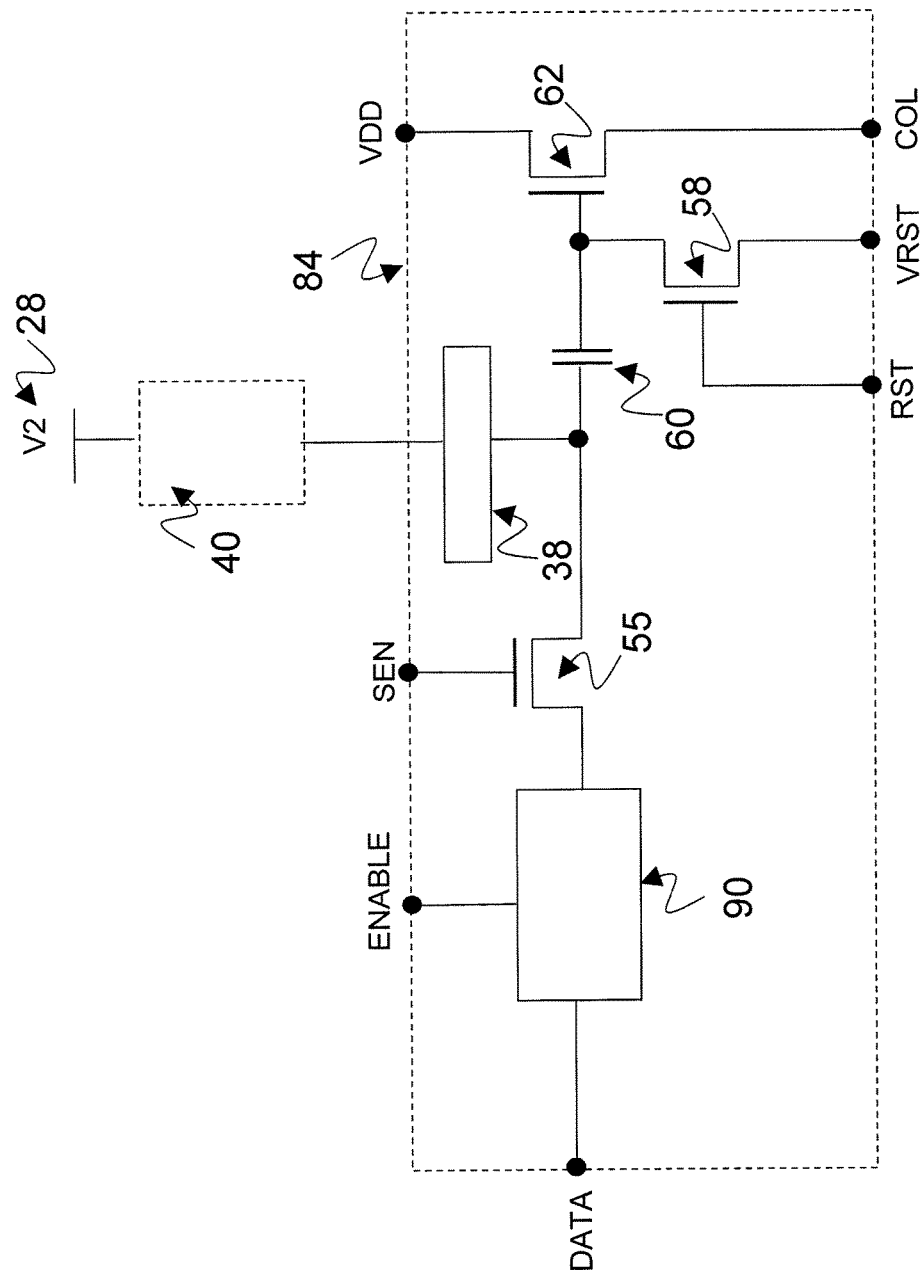
FIG. 14 is a schematic diagram depicting the array element circuit for use in the array elements of the exemplary AM-EWOD device of FIG. 4 according to a fourth and exemplary embodiment of the invention.

A fourth embodiment of the invention is comparable to the first embodiment with an alternative design of array element circuit as shown in FIG. 14.

According to this embodiment, the sensor part of the array element circuit is the same as previously described for the first embodiment. The actuation part of the circuit may have an alternative design as represented by the actuator circuit 90 in FIG. 14.

The connectivity of the array element circuit is as follows:

An actuation circuit 90 has an input DATA which may be common to all elements in the same column of the array and an input ENABLE which may be common to all elements in the same row of the array. Transistor 55 is connected between the output of the actuation circuit and the element electrode 38. The gate of transistor 55 is connected to the sensor input line SEN that actuates the impedance sensor circuit, which may be common to all elements in the same row of the array. The transistor 55 that receives the SEN input acts as the isolating element for isolating the element electrode from the actuation voltage during operation of the impedance sensor circuit. Capacitor 60 is connected between the element electrode 38 and the gate of sensing transistor 62. The drain of sensing transistor 62 is connected to a DC voltage source VDD, which may be common to all elements in the array. The source of sensing transistor 62 is connected to output COL which may be common to all elements in the same column of the array. Transistor 58 is connected between the gate of sensing transistor 62 and a voltage supply VRST which may be common to all elements in the array. The gate of transistor 58 is connected to an input signal RST which may be common to all elements in the same row of the array.

The actuator circuit performs the functions of:

Storing a programmed actuation state (for example actuated="1", non-actuated="0".

Supplying a voltage signal at the output of the actuation circuit 90 and to the drain of transistor 55.

The actuator circuit may be of any known design, for example as described in U.S. Pat. No. 8,173,000 herein incorporated by reference, using an SRAM element for storing the programmed actuation state, and having analogue switches for directing one of two voltage supplies to the element electrode 38 in accordance with the programmed actuation state. An advantage of the fourth embodiment is that it may combine designs of an actuation circuit optimized for a particular purpose (e.g. high frequency AC driving) with the sensor circuit and methods described in this invention.

An AM-EWOD device according to a fifth embodiment of the invention is comparable to any of the previous embodiments where the circuit is configured to sense the conductivity of the liquid droplet 4. The description of the previous embodiments has for the most part considered the load circuit 40 to be substantially capacitive in nature, and the description of the different array element circuits associated with each of embodiments 1-4 has considered how these circuits may be used to detect this capacitance and how this may be used to indicate the presence, absence or size of a liquid droplet 4 present at the location of a given array element. Equally, however, the sensor function of the previous embodiments may be configured to determine the complex impedance associated with the liquid droplet 4, an approximate electrical model which has already been described and shown in FIG. 6A. At low frequencies, the electrical resistance of the liquid droplet 4 is typically low enough such that the resistive component of the liquid droplet 4 (represented by resistor 22 in FIG. 6A) is small. Electrically the droplet functions in effect as a short circuit and the total impedance of the load circuit 40 is that of the capacitors in series associated with the insulator layer 20 and hydrophobic coatings 20 and 26. However, at higher frequencies the non-zero resistance of the liquid droplet 4 has a substantive effect, and the total impedance presented by the liquid droplet 4, and thus also the total impedance of the load circuit 40, becomes a function of the internal resistance 22 of the liquid droplet 4.

The effect of this resistance 22 has on the operation of the sensor circuit is described as follows. Equation 2 (previously presented) represents the approximate dependence of the voltage perturbation at the element electrode 38 as a function of the system impedances. In the case where the voltage signal applied to V2 during the Measurement Period is of sufficiently high frequency, the perturbation of the potential at the element electrode 38 and at the gate of sensing transistor 62 becomes dependent on the resistance of the liquid droplet 4. As the frequency of the V2 signal increases, the impedance of the load circuit $Z_L$ also increases, and the magnitude by which the potential at the gate of sensing transistor 62 is perturbed decreases.

Figure 15:
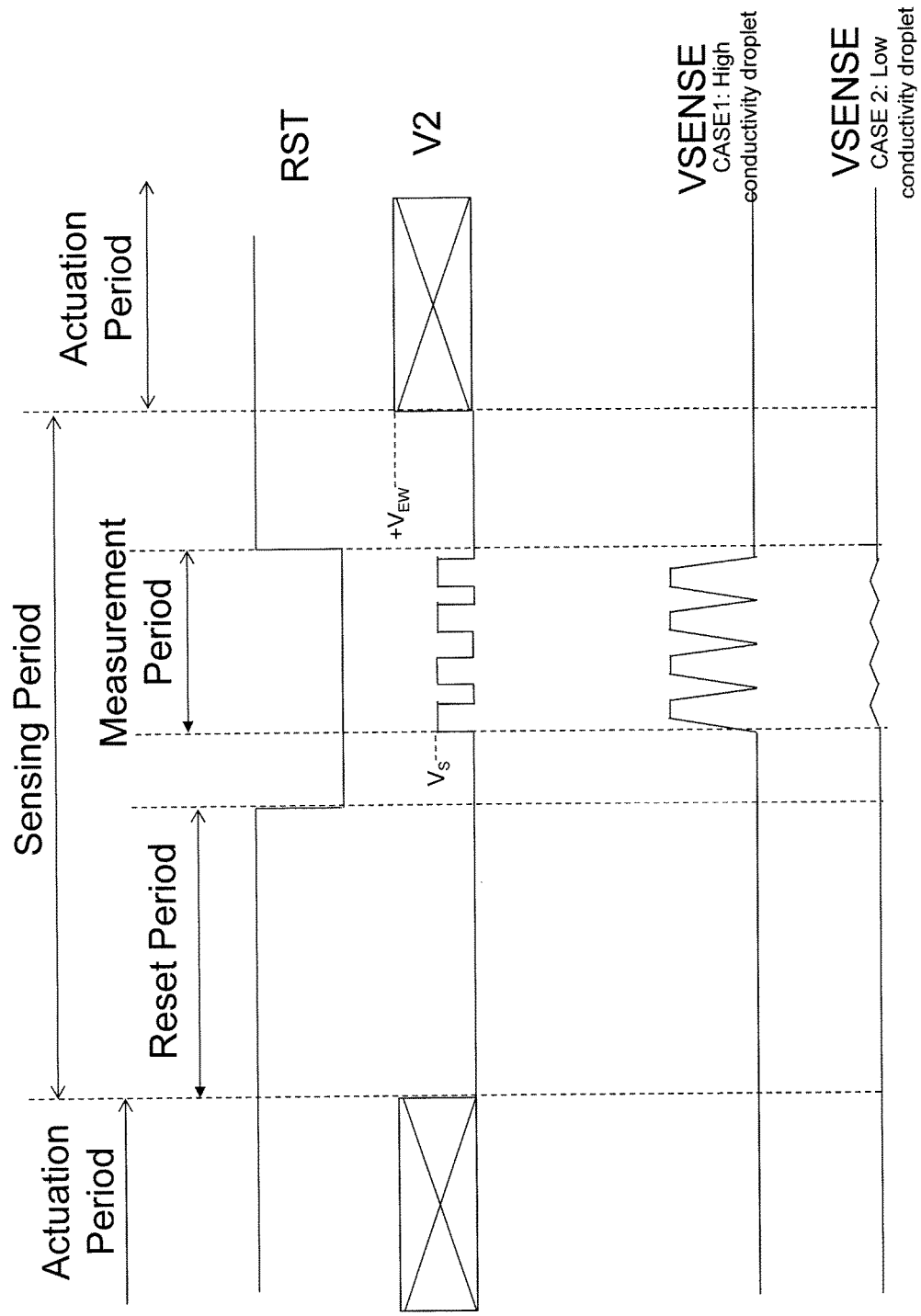
FIG. 15 is a timing diagram for driving the array element circuit of FIG. 11 according to a fifth and exemplary embodiment of the invention.

Accordingly, this effect may be exploited by configuring the frequency of the V2 signal during the Measurement Period such that the droplet resistance (resistor 22) may be measured. This method is shown in FIG. 15 which shows a timing diagram of example voltage signals that may be applied to drive the array element circuit of FIG. 11. During the Measurement Period, signal V2 is modulated such that a high frequency square-wave pulse is applied to the top substrate reference electrode 28. The internal node voltage generated at the gate of sensing transistor 62 (denoted VSENSE) is also shown on the timing diagram of FIG. 15 for CASE 1, where the liquid droplet 4 has a relatively high conductivity (resistor 22 has a small value) and CASE 2, where the liquid droplet 4 has a relatively low conductivity (i.e. resistor 22 has a large value). In CASE 1 the impedance of the load circuit ZL is relatively small and the voltage pulse signal applied to V2 couples efficiently through the potential divider part of the sensor circuit such that VSENSE is a near square-wave pulse of relatively large amplitude. In CASE 2, the impedance of load circuit ZL is relatively large and the voltage pulse signal applied to V2 does not couple efficiently through the potential divider part of the sensor circuit such that VSENSE is scarcely perturbed. In CASE 1 the overall effect is that sensing transistor 62 is turned on for some of the time (corresponding to the time for which V2 is high) and current is sunk through sensing transistor 62. This current (or it's average value) may then be measured by column electronics as previously described. In CASE 2 sensing transistor 62 remains substantially switched off for the duration of the Measurement Period and little or no current is sunk through sensing transistor 62.

Therefore, operation of the circuit in this way has facilitated a measurement of the conductivity of the liquid droplet 4 (represented by resistor 22 in FIG. 6A). It will be apparent to one skilled in the art how the frequency of the voltage pulse signal V2 applied to the reference electrode 28 may be configured according to the range of droplet conductivities being measured, for example by solution of equation 2 for the relevant system capacitances (which are fixed according to the circuit design and thicknesses of the applied coatings). For example, the perturbing voltage signal applied to V2 may be of frequency in the range 1 kHz-10 MHz, or in the range 10 kHz-1 MHz or around 100 kHz. Similarly, multiple frequencies of the voltage signal V2 may be used to measure different ranges of droplet conductivities. Similarly, the voltage signal applied to V2 during the Measurement Period may be a square-wave (as described) or may be a triangle wave, saw-tooth or sinusoid.

Figure 3:
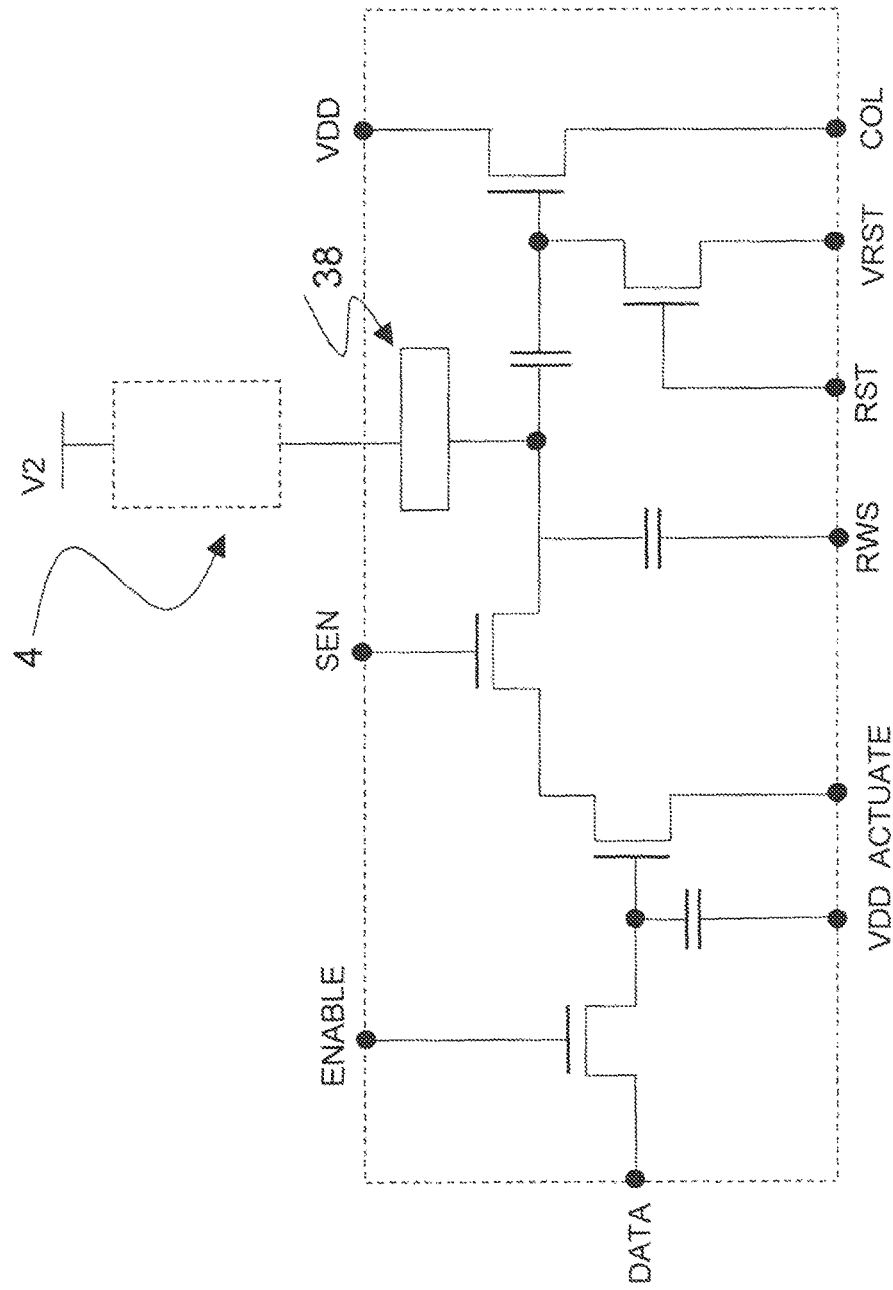
FIG. 3 shows prior art, particularly a 2-transistor AM-EWOD array element actuation circuit with additional impedance sensor function.

Importantly, it is realized that the arrangement of this invention, whereby the perturbative voltage signal that operates the potential divider is applied to the reference electrode 28, has advantages over the arrangements described in prior art whereby the perturbative voltage pulse is applied by a row select line, e.g. RWS in prior art FIG. 3. In particular, the application of a high frequency voltage signal through a row addressing line on the TFT substrate requires a very low impedance drive circuitry such that a high frequency pulse may be communicated to the array element circuit. At very high frequencies (e.g. 10 MHz) in prior art configurations this may be impossible or impractical due to the limitations of wiring resistances if the devices are manufactured using a standard TFT displays manufacturing process. At lower frequencies (e.g. 100 kHz-1 MHz) this may make the size of buffer circuitry, for example as used in the sensor row addressing circuit 88 physically large, thus consuming additional area on the TFT substrate and increasing the overall footprint and manufacturing cost of the device. By contrast, using the arrangement of the present invention it is possible for a low resistance connection to be made to the reference electrode 28 and so high frequency driving signals may be applied to V2 without such difficulties.

An advantage of the operation of the device according to this embodiment is that a property of the liquid droplet 4, particularly its conductivity, may be measured. This may be used for example to determine the ionic concentration of the liquid droplet 4 (for example the salt content if the liquid droplet 4 is aqueous). This may be useful, for example, to determine the result of a chemical or biochemical test (an assay) or to differentiate different species of droplets according to their ionic content.

As another example, this method may advantageously be used to determine the presence or absence of one or more particles within the liquid droplet, since the presence or absence of particles may influence the real and imaginary contributions of the droplet impedance, as represented in the model of FIG. 6A as resistor 22 and capacitor 24. This may, for example, be useful in detecting the presence or absence of particles such as magnetic beads, biological cells or precipitation within the liquid droplet 4.

Figure 16:
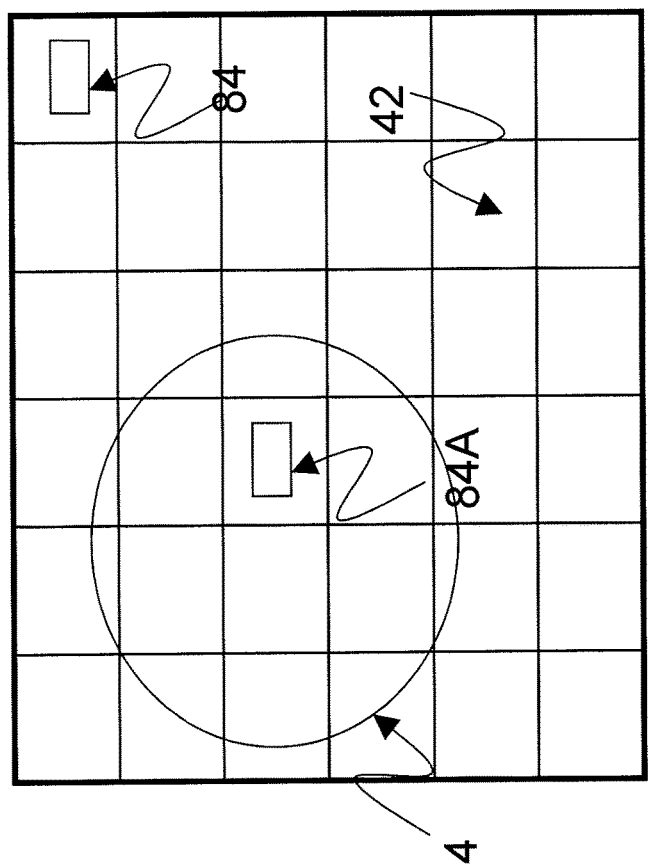
FIG. 16 shows an example arrangement of a liquid droplet on the array according to an exemplary configuration of the fifth embodiment of the invention.

Optionally, and advantageously, the methods of this embodiment may be used in the case where the liquid droplet 4 has a size equal to or greater than the size of the element electrode 38. Such an arrangement is shown in FIG. 16. This shows the electrode array 42, with each element containing an array element circuit 84 (which includes an element electrode 38). In this case the liquid droplet 4 may cover multiple element electrodes 38 simultaneously. This arrangement is advantageous since for a given array element circuit completely covered by the liquid droplet 4 (e.g. 84A), it may be concluded that any measurable differences in the measured impedance must relate to the properties of the liquid droplet (e.g. the values of resistor 22 and capacitor 24) rather than to the extent to which the liquid droplet 4 wholly or partially covers the element electrode 38 in that location.

Whilst in the preceding embodiments, the invention has been described in terms of an AM-EWOD device utilizing thin film electronics 74 to implement array element circuits and driver systems in thin film transistor (TFT) technology, the invention could equally be realized using other standard electronic manufacturing processes, e.g. Complementary Metal Oxide Semiconductor (CMOS), bipolar junction transistors (BJTs), and other suitable processes.

An aspect of the invention, therefore, is an active matrix electro-wetting on dielectric (AM-EWOD) device. In exemplary embodiments, the AM-EWOD device includes a plurality of array elements arranged in an array of rows and columns, each of the array elements including array element circuitry, an element electrode, and a reference electrode. The array element circuitry includes an actuation circuit configured to apply actuation voltages to the element and reference electrodes for actuating the array element, and an impedance sensor circuit configured to sense impedance at the array element electrode to determine a droplet property at the array element, and wherein the impedance sensor circuit is configured to be operated by perturbing a potential applied to the reference electrode. Exemplary embodiments of the AM-EWOD device may include one or more of the following features, either individually or in combinations.

In an exemplary embodiment of the AM-EWOD device, the AM-EWOD device further includes a common addressing line, and whereby the impedance sensor circuit is configured to be operated by supplying voltage signals over the common addressing line to effect both a reset operation and an operation for selecting a row in the array to be sensed.

In an exemplary embodiment of the AM-EWOD device, the impedance sensor circuit is configured to be operated by perturbing a potential applied to the reference electrode and by perturbing a potential applied to the common addressing line.

In an exemplary embodiment of the AM-EWOD device, the common addressing line is common to all elements in the same row of the array.

In an exemplary embodiment of the AM-EWOD device, the impedance sensor circuit further comprises a capacitor connected between the element electrode and the gate of a sensing transistor, and the impedance at the array element is sensed based on a change in a sensing voltage coupled across the capacitor.

In an exemplary embodiment of the AM-EWOD device, the impedance sensor circuit further comprises a transistor for setting the voltage at the gate of the sensing transistor.

In an exemplary embodiment of the AM-EWOD device, the sensing transistor and the transistor for setting the voltage at the gate of the sensing transistor are n-type transistors.

In an exemplary embodiment of the AM-EWOD device, the actuator circuit comprises isolating elements configured to isolate the element electrode from the actuation voltage during operation of the impedance sensor circuit.

In an exemplary embodiment of the AM-EWOD device, the AM-EWOD device further includes a sensor input line for actuating the impedance sensor circuit, wherein the isolating elements include a transistor between the actuation circuit and the impedance sensor circuit that receives an input from the sensor input line.

In an exemplary embodiment of the AM-EWOD device, the isolating elements include an isolating capacitor that is connected to a row addressing line.

In an exemplary embodiment of the AM-EWOD device, the AM-EWOD device further includes a sensor input line for actuating the impedance sensor circuit, and an isolating transistor between the actuation circuit and the impedance sensor circuit that receives an input from the sensor input line. The isolating transistor isolates the actuation circuit from the impedance sensor circuit during operation of the impedance sensor circuit.

In an exemplary embodiment of the AM-EWOD device, the actuation circuit comprises a memory part for storing data corresponding to either an actuated state or an unactuated state of the array element, and an actuation part for supplying the actuation voltages to the element electrode and the reference electrode.

In an exemplary embodiment of the AM-EWOD device, the actuation circuit is comprised of a single transistor and a single capacitor configured as a Dynamic RAM element.

Another aspect of the invention is a method of operating an active matrix electro-wetting on dielectric (AM-EWOD) device. In exemplary embodiments, the operating method includes the steps of: arranging a plurality of array elements in an array of rows and columns, each of the array elements including array element circuitry, an element electrode, and a reference electrode, and the array element circuitry comprises an actuation circuit and an impedance sensor circuit; applying actuation voltages with the actuation circuit to the element and reference electrodes to actuate the array element; perturbing a potential applied to the reference electrode; sensing impedance at the array element electrode with the impedance sensor circuit; and determining a droplet property at the array element based on the sensed imped-ance. Exemplary embodiments of the operating method may include one or more of the following features, either individually or in combinations.

In an exemplary embodiment of the operating method, the AM-EWOD device further comprises a common addressing line, the operating method further comprising supplying voltage signals over the common addressing line to effect both a reset operation and an operation for selecting a row in the array to be sensed.

In an exemplary embodiment of the operating method, the operating method further includes operating the impedance sensor circuit by perturbing a potential applied to the reference electrode and by perturbing a potential applied to the common addressing line.

In an exemplary embodiment of the operating method, the impedance sensor circuit includes a capacitor connected between the element electrode and a gate of a sensing transistor, the operating method further comprising sensing the impedance at the array element based on a change in a sensing voltage coupled across the capacitor.

In an exemplary embodiment of the operating method, the operating method further includes isolating the array element from the actuation voltage during operating of the impedance sensor circuit.

In an exemplary embodiment of the operating method, the isolating step comprises applying an input to a sensor input line to actuate the impedance sensor circuit.

In an exemplary embodiment of the operating method, applying the actuation voltages comprises: storing data in a memory part of the actuation circuit corresponding to either an actuated state or an unactuated state of the array element; and supplying the actuation voltages with an actuation part of the actuation circuit to the element electrode and the reference electrode.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

Optionally the device may also be arranged such that embodiments of the invention may be utilized in just a part or sub-array of the entire device. Optionally some or all of the multiple different embodiments may be utilized in different rows columns or regions of the device.

INDUSTRIAL APPLICABILITY

The described embodiments could be used to provide an enhance AM-EWOD device. The AM-EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, and tools for research in life sciences and forensic science.

What is claimed is:

1. An active matrix electro-wetting on dielectric (AM-EWOD) device comprising:
   a plurality of array elements arranged in an array of rows and columns, each of the array elements including array element circuitry, an element electrode, and a reference electrode;
   wherein the array element circuitry comprises:
   an actuation circuit configured to apply actuation voltages to the element and reference electrodes for actuating the array element; and
   an impedance sensor circuit configured to sense impedance at the array element electrode to determine a droplet property at the array element, and wherein the impedance sensor circuit is configured to be operated by perturbing a potential applied to the reference electrode.

2. The AM-EWOD device of claim 1, further comprising a common addressing line, and whereby the impedance sensor circuit is configured to be operated by supplying voltage signals over the common addressing line to effect both a reset operation and an operation for selecting a row in the array to be sensed.

3. The AM-EWOD device of claim 2, wherein the impedance sensor circuit is configured to be operated by perturbing a potential applied to the reference electrode and by perturbing a potential applied to the common addressing line.

4. The AM-EWOD device of claim 1, wherein the common addressing line is common to all elements in the same row of the array.

5. The AM-EWOD device of claim 1, wherein the impedance sensor circuit further comprises a capacitor connected between the element electrode and the gate of a sensing transistor, and the impedance at the array element is sensed based on a change in a sensing voltage coupled across the capacitor.

6. The AM-EWOD device of claim 5, wherein the impedance sensor circuit further comprises a transistor for setting the voltage at the gate of the sensing transistor.

7. The AM-EWOD device of claim 6, wherein the sensing transistor and the transistor for setting the voltage at the gate of the sensing transistor are n-type transistors.

8. The AM-EWOD device of claim 1, wherein the actuator circuit comprises isolating elements configured to isolate the element electrode from the actuation voltage during operation of the impedance sensor circuit.

9. The AM-EWOD device of claim 8, further comprising a sensor input line for actuating the impedance sensor circuit, wherein the isolating elements include a transistor between the actuation circuit and the impedance sensor circuit that receives an input from the sensor input line.

10. The AM-EWOD device of claim 8, wherein the isolating elements include an isolating capacitor that is connected to a row addressing line.

11. The AM-EWOD device of claim 1, further comprising:
   a sensor input line for actuating the impedance sensor circuit; and
   an isolating transistor between the actuation circuit and the impedance sensor circuit that receives an input from the sensor input line, wherein the isolating transistor isolates the actuation circuit from the impedance sensor circuit during operation of the impedance sensor circuit.

12. The AM-EWOD device of claim 1, wherein the actuation circuit comprises:
   a memory part for storing data corresponding to either an actuated state or an unactuated state of the array element; and
   an actuation part for supplying the actuation voltages to the element electrode and the reference electrode.

13. The AM-EWOD device of claim 12 wherein the actuation circuit is comprised of a single transistor and a single capacitor configured as a Dynamic RAM element.

14. A method of operating an active matrix electro-wetting on dielectric (AM-EWOD) device comprising the steps of:
   arranging a plurality of array elements in an array of rows and columns, each of the array elements including array element circuitry, an element electrode, and a reference electrode, and the array element circuitry comprises an actuation circuit and an impedance sensor circuit;
   applying actuation voltages with the actuation circuit to the element and reference electrodes to actuate the array element;
   perturbing a potential applied to the reference electrode;
   sensing impedance at the array element electrode with the impedance sensor circuit; and
   determining a droplet property at the array element based on the sensed impedance.

15. The operating method of claim 14, wherein the AM-EWOD device further comprises a common addressing line,
   the operating method further comprising supplying voltage signals over the common addressing line to effect both a reset operation and an operation for selecting a row in the array to be sensed.

16. The operating method of claim 15, further comprising operating the impedance sensor circuit by perturbing a potential applied to the reference electrode and by perturbing a potential applied to the common addressing line.

17. The operating method of claim 14, wherein the impedance sensor circuit includes a capacitor connected between the element electrode and a gate of a sensing transistor;
   the operating method further comprising sensing the impedance at the array element based on a change in a sensing voltage coupled across the capacitor.

18. The operating method of claim 14, further comprising isolating the array element from the actuation voltage during operating of the impedance sensor circuit.

19. The operating method of claim 18, wherein the isolating step comprises applying an input to a sensor input line to actuate the impedance sensor circuit.

20. The operating method of claim 14, wherein applying the actuation voltages comprises:
   storing data in a memory part of the actuation circuit corresponding to either an actuated state or an unactuated state of the array element; and
   supplying the actuation voltages with an actuation part of the actuation circuit to the element electrode and the reference electrode.

* * * * *